United States Patent [19]

Okawa et al.

[11] Patent Number: 4,876,966

[45] Date of Patent: * Oct. 31, 1989

[54] TRANSPORT CONTROL SYSTEM WITH LINEAR MOTOR DRIVE

[76] Inventors: Kazuyoshi Okawa, 1810-2, Kobiki-cho, Hachiouji-shi, Tokyo 193; Kazumasa Moriya, 6-4-9, Kamikizaki, Urawa-shi, Saitama 338; Tomoyuki Kashiwazaki, 4-21-1, Hosoyama, Asao-ku, Kawasaki-shi, Kanagawa 215; Hiroshi Kawashima, 4-12-25, Higashikashiwagaya, Ebina-shi Kanagawa 243-04; Yoshitaka Murakawa, 3-16-29, Nishihara-cho, Fuchu-shi, Tokyo 183, all of Japan

[ * ] Notice: The portion of the term of this patent subsequent to Jan. 26, 2005 has been disclaimed.

[21] Appl. No.: 60,081

[22] Filed: Jun. 8, 1987

Related U.S. Application Data

[63] Continuation of Ser. No. 708,586, Mar. 5, 1985, Pat. No. 4,721,045.

[30] Foreign Application Priority Data

Mar. 6, 1984 [JP] Japan ............................... 59-043590
Mar. 6, 1984 [JP] Japan ............................... 59-043591

[51] Int. Cl.$^4$ ...................... H02K 41/00; B60L 15/22
[52] U.S. Cl. .................................... 104/290; 104/292; 318/135
[58] Field of Search ............... 104/290, 292, 295, 298; 246/282, 31, 122 R, 5, 187 B; 318/38, 135, 687; 364/426, 138

[56] References Cited

U.S. PATENT DOCUMENTS

| | | | |
|---|---|---|---|
| 3,803,466 | 4/1974 | Starkey | 104/292 |
| 3,904,942 | 9/1975 | Holz | 104/292 |
| 3,974,778 | 8/1976 | Black et al. | 104/292 |
| 4,055,123 | 10/1977 | Heidelberg | 104/292 |
| 4,068,152 | 1/1978 | Nakamura et al. | 104/292 |
| 4,238,715 | 12/1980 | Parsch et al. | 104/292 |
| 4,348,618 | 9/1982 | Nakamura et al. | 104/295 |
| 4,463,290 | 7/1984 | Asakawa et al. | 318/135 |
| 4,721,045 | 1/1988 | Okawa et al. | 104/290 |

FOREIGN PATENT DOCUMENTS 59-6791 1/1984 Japan .

Primary Examiner—Johnny D. Cherry
Assistant Examiner—Donald T. Hajec

[57] ABSTRACT

A transport control system with linear motor drive applicable for cash transport in a bank. The system uses a main controller, a rail-path, a carrier adapted to be driven along the rail-path by linear motor drive, and a plurality of stator portions coupled to the rail-path to produce a driving force in association with the carrier. Each of the stator portions includes a stator controller for controlling the driving of the carrier. The stator controller controls the driving of the carrier passing the stator portion to which the stator controller belongs to cause the carrier to reach a destination stator portion.

5 Claims, 27 Drawing Sheets

Fig. 7

TABLE

| RAIL-PATH SHAPE | MAXIMUM SPEED $V_{MAX}$ | MINIMUM SPEED $V_{MIN}$ | CORRECTION VALUE |
|---|---|---|---|
| STRAIGHT | Max | Min | a |
| CURVE | Max $-\ell$ | Min $+$ m | b |
| UP SLOPE | Max | Min $+$ P | c |
| DOWN SLOPE | Max $-$ q | Min $-$ P | d |
| CURVE & UP SLOPE | Max $-\ell$ | Min$+$m$+$P | e |
| CURVE & DOWN SLOPE | Max $-\ell-$q | Min$+$m$-$P | f |

LINEAR MOTOR CONTROLLER

Fig. 10
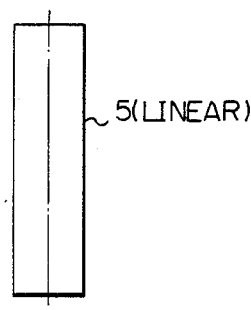
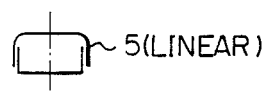
Fig. 11
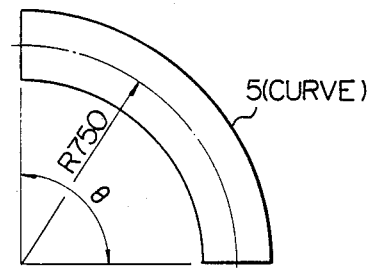
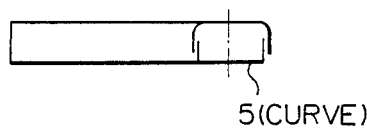
Fig. 12
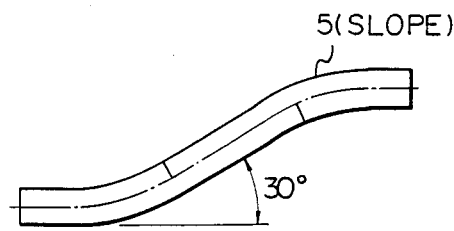
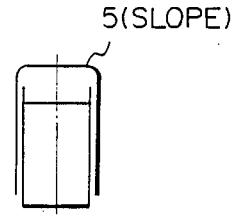

Fig. 13
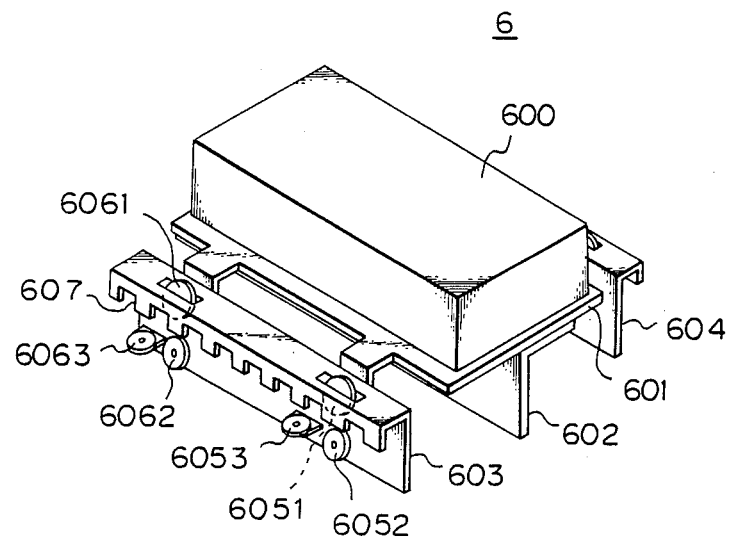
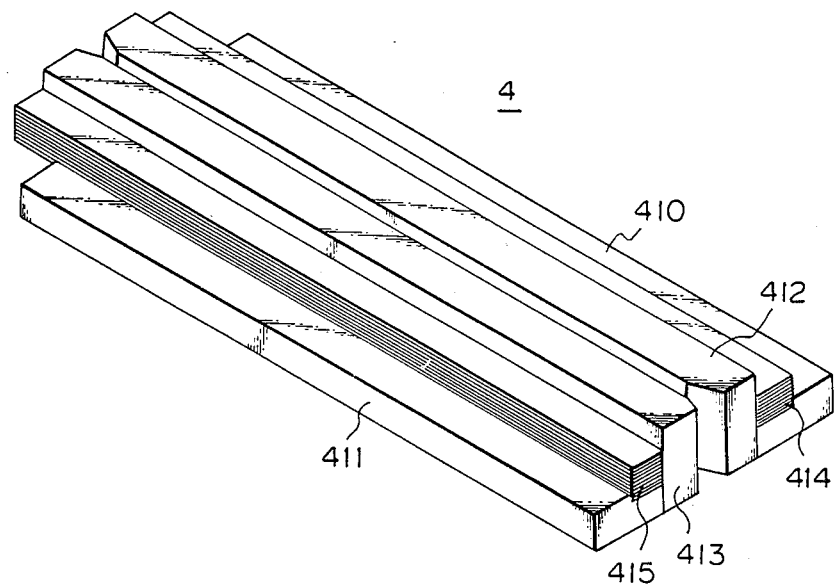

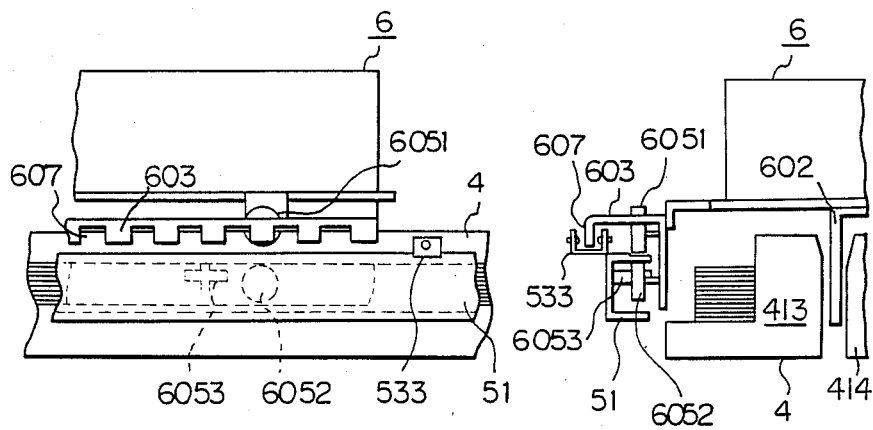

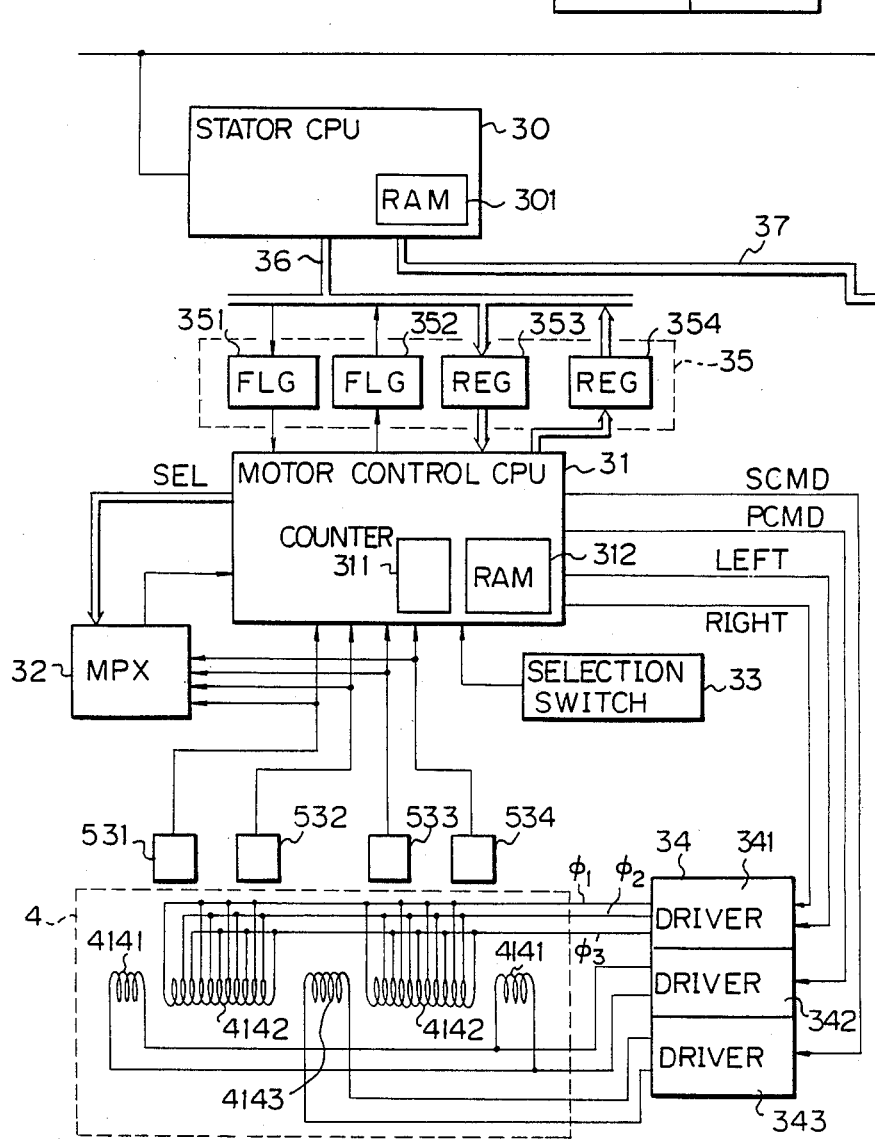

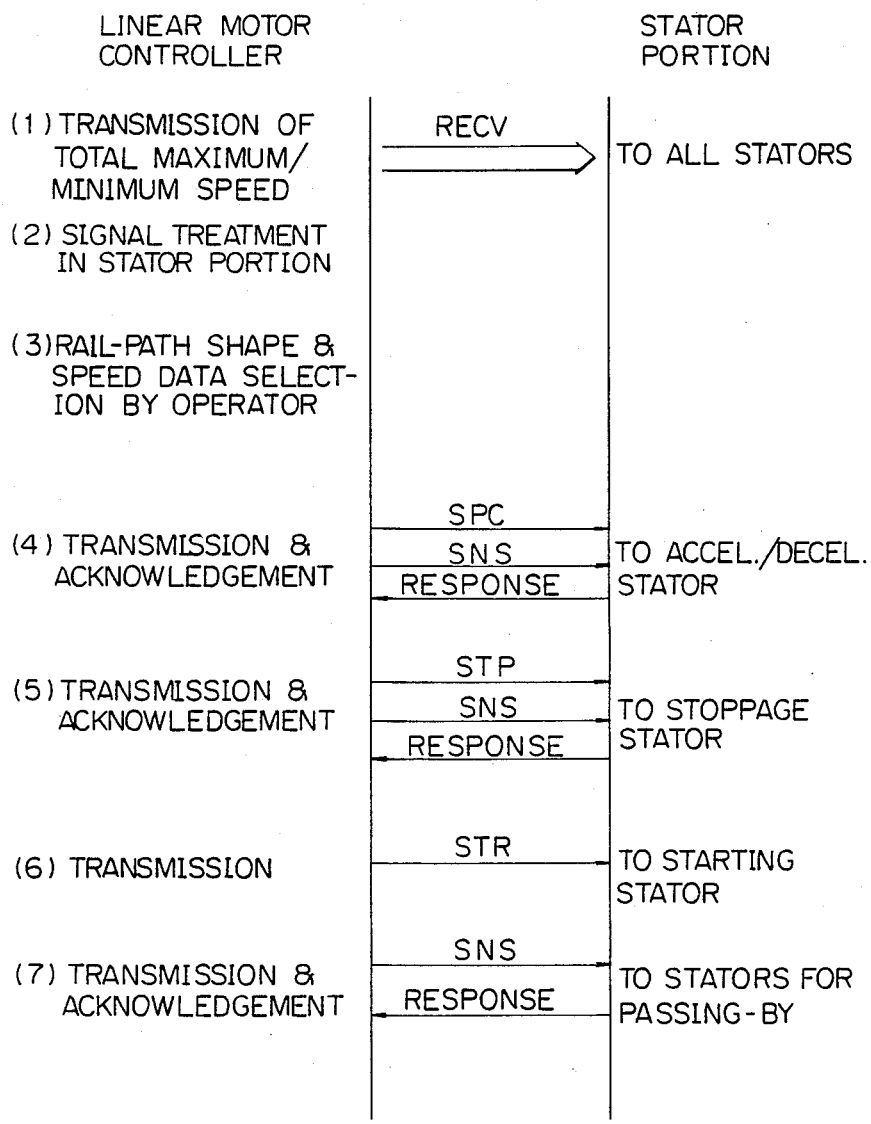

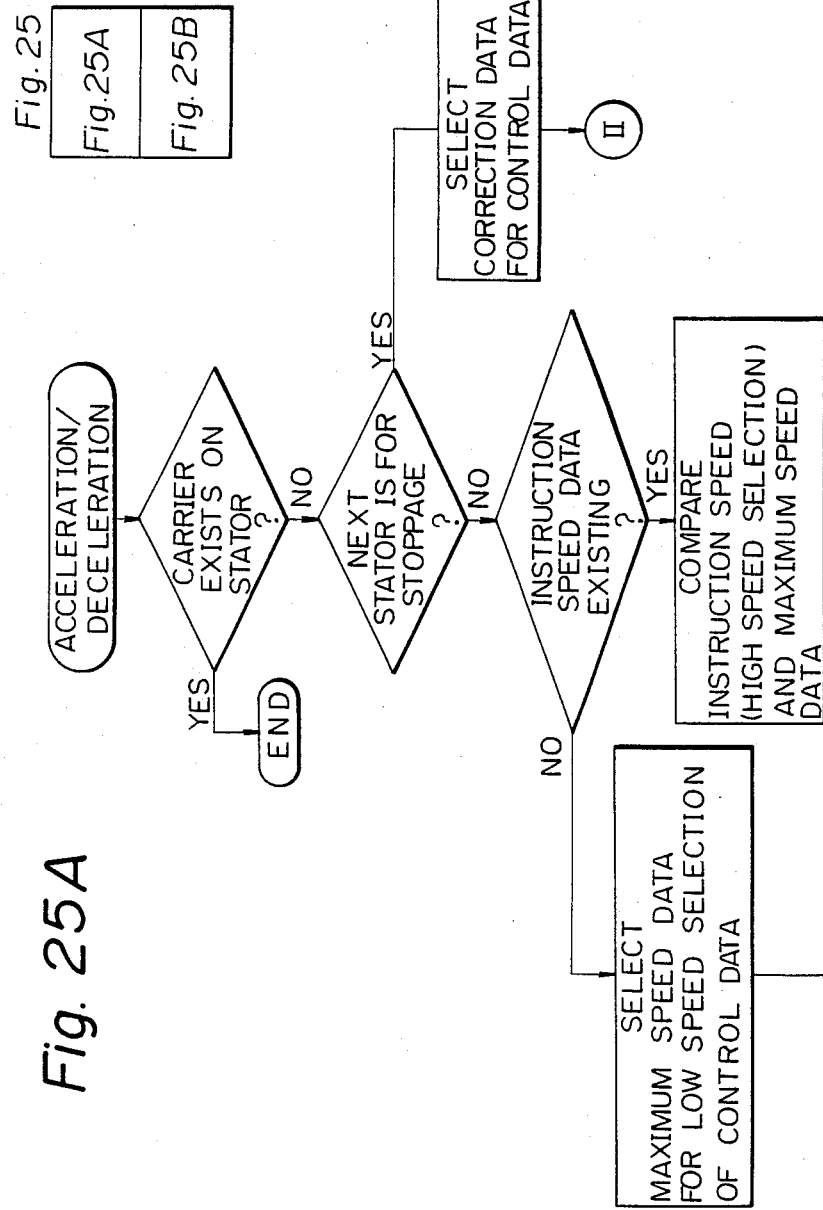

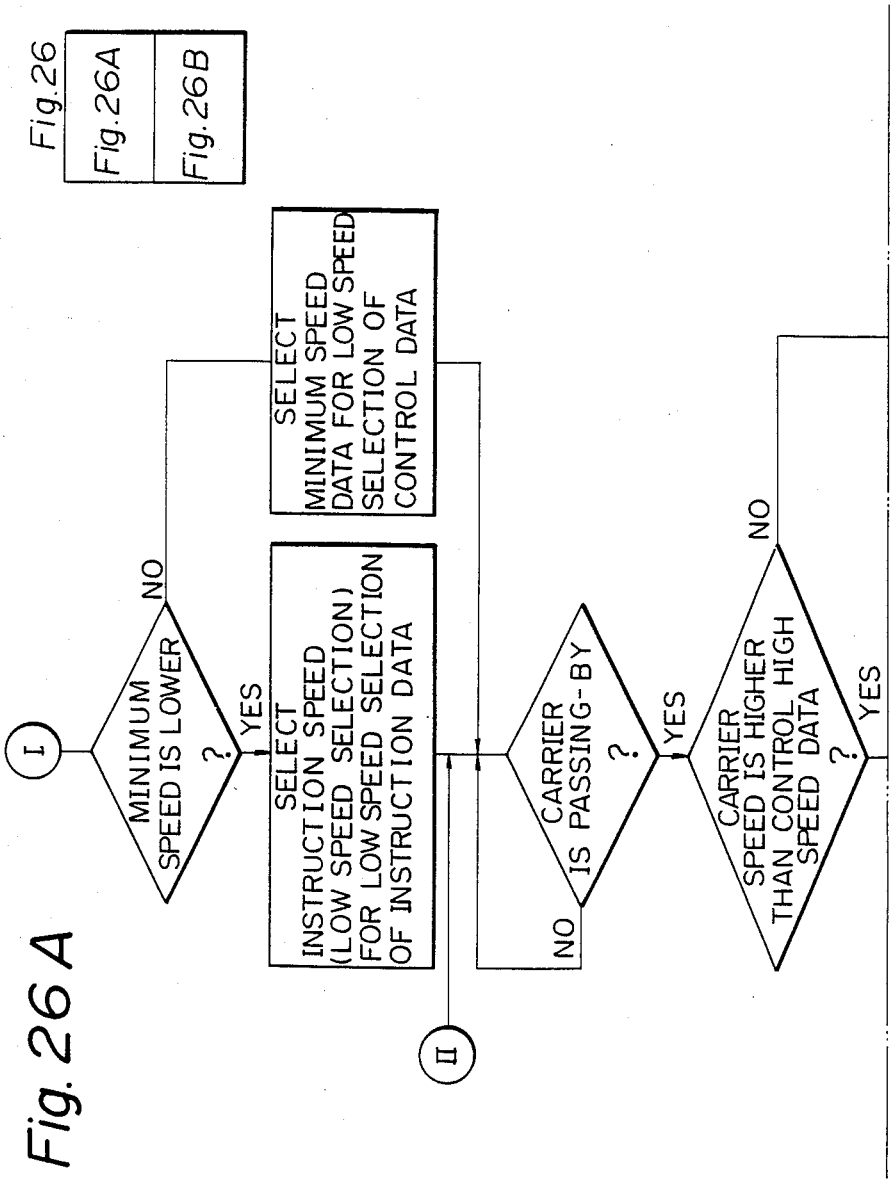

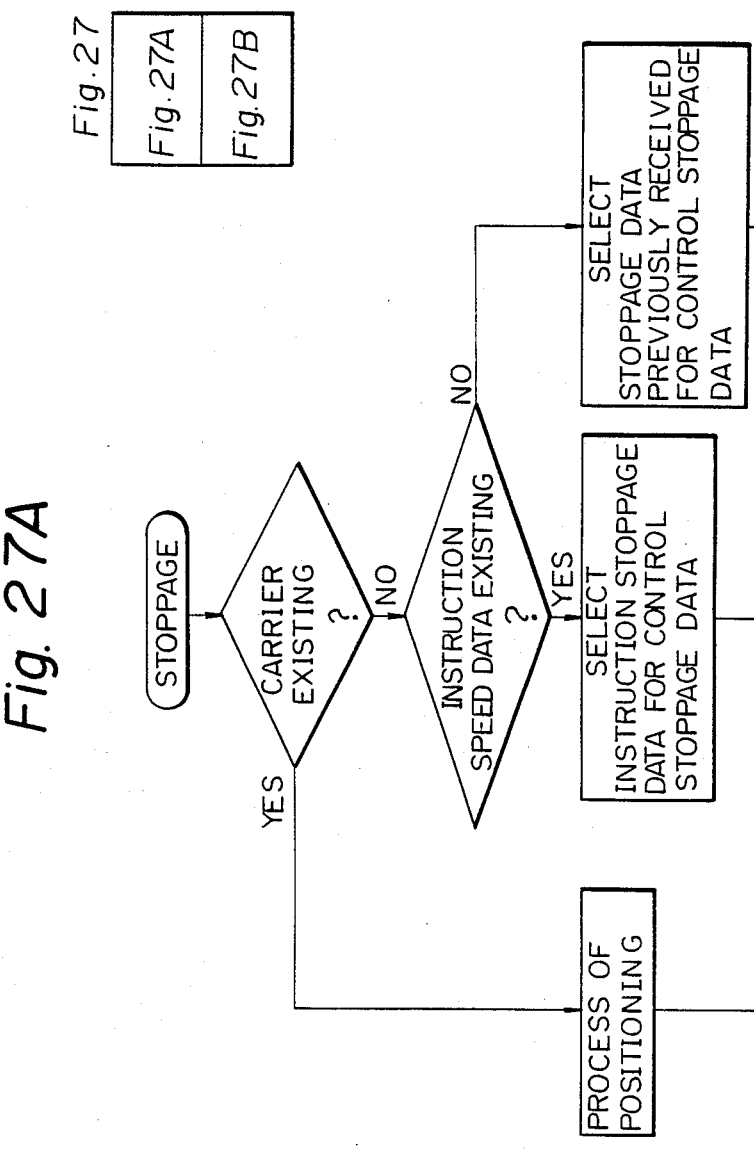

TRANSPORT CONTROL SYSTEM WITH LINEAR MOTOR DRIVE

This is a continuation of copending application Ser. No. 708,586 filed on Mar. 5, 1985 now U.S. Pat. No. 4,721,045.

BACKGROUND OF THE INVENTION

1. Field of the Invention

The present invention relates to a transport control system with linear motor drive wherein a carrier having a rotor plate as a secondary conductor is driven along a rail-path having a plurality of stator portions upon energization of the stator portions and, more particularly, to a transport control system with linear motor drive wherein a control function is provided in each stator portion having the corresponding stator. The system according to the present invention is used for cash transportation in a bank or the like.

2. Description of the Related Art

As a transport means, the linear motor car system has attracted a great deal of attention, since high-speed transportation can be achieved thereby without the need to mount a power source in the carrier. In a conventional linear motor car system, a plurality of stator portions are coupled to a rail-path, and a rotor plate is mounted in a carrier. An electric force is supplied to the rotor plate by energizing the corresponding stator portion, thereby driving the carrier. When the stator portion is deenergized, the carrier is stopped. Therefore, once the carrier receives the driving force from a given stator portion, it needs no additional external force and will run freely until reaching the next stator portion. At a carrier stoppage position, the carrier is stopped by a reverse driving force output from the corresponding stator portion.

In such a linear motor car system, the carrier itself need not include a power source but is driven only by energization of the stator portions coupled to the rail-path. Therefore, the carrier can be moved at a high speed and can be made compact in size, thereby minimizing the overall dimensions of the transport system and making it particularly suitable for document transportation in an office, or the like.

In a conventional linear motor car system, the respective stator portions coupled along the rail-path are sequentially energized/deenergized by a linear motor controller when the carrier is running. Thus, the carrier is started, accelerated, decelerated or stopped and is driven from a desired stator portion to another desired stator portion. The linear motor controller controls the respective stators in accordance with the running state of the carrier in such a manner that when the carrier passes through a stator portion, it is controlled to run at a predetermined speed or it is stopped.

In a conventional transport control system wherein a carrier is driven along a rail-path having stator portions, a system controller (microprocessor) supplies running instructions to a linear motor controller (microprocessor) in accordance with running requests from associated equipment (e.g., an auto-cashier). The linear motor controller controls the stators arranged in stator portions along the rail-path for driving the carrier. The carrier is started from a start position (a given stator portion), is accelerated or decelerated to pass through subsequent stator portions, and is stopped at a desired stop position (another given stator portion). In such a conventional control system, the linear motor controller must always detect an operating status of each stator portion and directly control the stator in such a manner that the carrier is running at a desired speed at the corresponding stator portion. This condition means that the linear motor controller alone receives and processes a plurality of status signals from the respective stator portions, and thus the processing capacity is limited.

When the number of stator portions is small, this limitation will not cause any significant problems. However, when the number of stator portions is increased or the distance between each two adjacent stator portions is very short, the processing capacity of the linear motor controller cannot cope with the actual number of processing requests. To overcome this obstacle, the carrier must be driven at a low speed, which causes some inconvenience. Also, when a system layout is changed, the processing contents of the linear motor controller must be updated, and the operation becomes complicated. In addition, since the processing capacity is limited, processing a malfunction or failure is likewise limited, and during an operation failure, control of the carrier may be interrupted, with the result that business operations are temporarily halted.

SUMMARY OF THE INVENTION

It is an object of the present invention to ensure that properly coordinated operations are carried out between a main controller and stator controllers for carrier transport control when a linear motor drive is employed, and to carry out preliminary control for the linear motor drive and subsequent control of the carrier when it arrives at each stator controller, thereby driving the carrier accurately and at a high speed.

According to a basic aspect of the present invention, there is provided a transport control system with linear motor drive comprising a main controller, a rail-path, a carrier adapted to be driven along the rail-path by linear motor drive, and a plurality of stator portions coupled to the rail-path to produce a driving force in association with the carrier. In this transport control system, each of the stator portions comprises a stator controller for controlling the driving of the carrier in such a manner that the stator controller controls the driving of the carrier passing the stator portion to which the stator controller belongs to cause the carrier to reach the stator portion which is its destination.

The present invention also provides a transport control system with linear motor drive by using a main controller, a rail-path, a carrier adapted to be driven along the rail-path by linear motor drive, and a plurality of stator portions coupled to the rail-path to produce a driving force in association with the carrier. Each of the stator portions includes a stator controller for controlling the driving of the carrier. The main controller has means for multiple address transmission of optimal speed range. The stator controller has means for rail configuration selection, and is adapted to select the speed range on the basis of the selection by the rail configuration selection means.

BRIEF DESCRIPTION OF THE DRAWINGS

FIG. 7 is a table for explaining speed control;

FIGS. 10, 11, and 12 are representations showing rail-path configurations, respectively;

FIG. 13 is a perspective view showing a carrier and a stator;

FIGS. 14, 15, and 16, respectively, are schematic views for explaining the operation of the carrier and the stator;

FIGS. 21A and 21B are diagrams showing the configuration of the stator controller in the system of FIG. 3;

FIG. 22 is a representation for explaining the transmission/reception operation;

FIGS. 25A, 25B, 26A and 26B respectively, are flow charts for explaining the acceleration/deceleration mode;

FIG. 27A and 27B are flow chart for explaining the stop mode;

DETAILED DESCRIPTION OF THE PREFERRED EMBODIMENTS

Before the preferred embodiments of the present invention are described, the prior art will be described with reference to FIGS. 1 and 2 to give a better understanding of the present invention.

Figure 1:
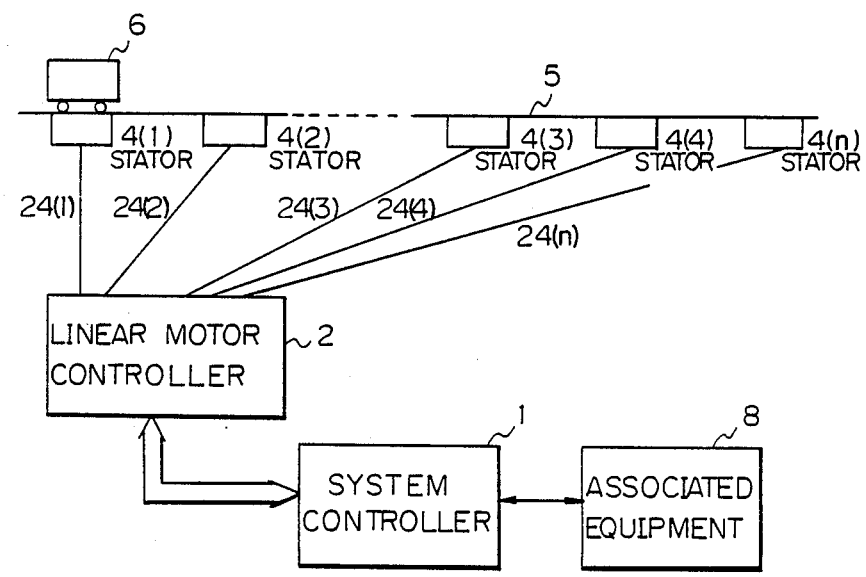
FIG. 1 is a block diagram for explaining a conventional linear motor car control system.

As shown in FIG. 1, in a conventional transport control system wherein a carrier 6 is driven along a rail-path 5 coupled to a plurality of stators 4(1) to 4(n), a system controller 1 supplies an instruction to a linear motor controller 2 in accordance with a request from associated equipment 8. The linear motor controller 2 controls the stators 4(1) to 4(n) for driving the carrier 6 via cables 24. The carrier 6 is started from a start position (e.g., the stator 4(1)), accelerated or decelerated to pass by subsequent stators and stopped at a desired stop position (e.g., the stator 4(n)). According to the conventional system of this type, the linear motor controller 2 constantly detects the status of each stator and directly controls the stator in such a manner that, upon reaching the stator, the carrier 6 is running at a desired velocity. Accordingly, the linear motor controller 2 must receive and process a plurality of status signals from the respective stators, and as a result, the processing capacity of the controller 2 is limited.

This factor causes little trouble when the number of stators is small. However, when the number of stators is large or the distance between every two adjacent stators is short, the processing capacity of the linear motor controller 2 cannot cope with the increased number of processing requests. Therefore, the speed of the carrier must be decreased. When a system layout is modified, the processing contents of the linear motor controller 2 must be updated, and as a result, the operations become complicated. In addition, since the processing capacity is limited, if a failure occurs then processing is interrupted and the carrier may be temporarily out of control.

Assume that among the four stators 4(1) to 4(4) along the rail-path 5, the stator 4(1) is defined as the start position, the stator 4(4) is defined as the stop position, and the remaining stators 4(2) and 4(3) are used for accelerating/decelerating the carrier 6 as in the conventional linear motor system. Conventionally, the linear motor controller 2 sends a start command STR to the stator 4(1), as shown in FIG. 2(1), to start the carrier 6 from the stator 4(1). After the carrier 6 is started, the controller 2 sends an acceleration/deceleration command SPC to the stator 4(2), as shown in FIG. 2(2), to accelerate or decelerate the carrier 6 at the stator 4(2). As shown in FIG. 2(3), the controller 2 then sends the command SPC to the stator 4(3) to accelerate or decelerate the carrier 6 at the stator 4(3). When the carrier 6 passes by the stator 4(3), the controller 2 sends a stop command STP to the stator 4(4), as shown in FIG. 2(4), thereby stopping the carrier 6 at the stator 4(4).

Figure 2:
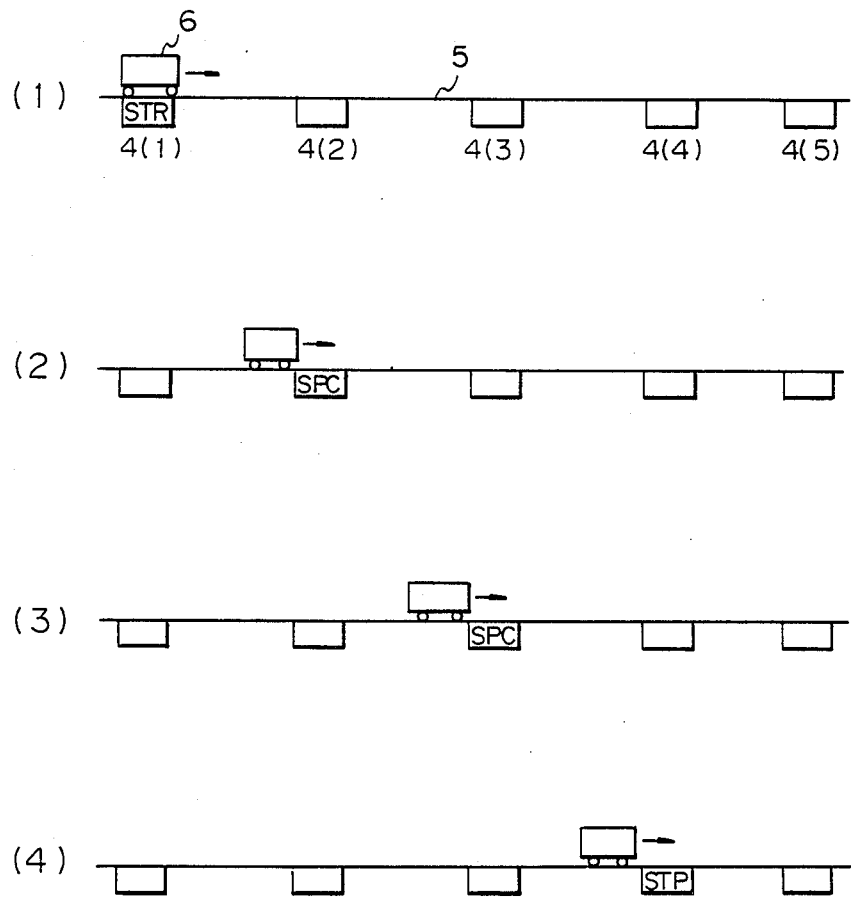
FIG. 2 is a representation for explaining the control operation of the system shown in FIG. 1.

In normal operation, the control operation in FIG. 2 is performed in such a manner that the stators are sequentially controlled by following the movement of the carrier 6 along the rail-path. However, if a failure occurs, then a run-away of the carrier 6 cannot be prevented.

When a failure occurs at an interface between the linear motor controller and the stators 4(2), 4(3), and 4(4), even if a command is sent to these stators after the carrier 6 has left the stator 4(1), the carrier 6 will not operate normally. In this case, the carrier 6 will not be correctly controlled at these stators 4(2) to 4(4) and a run-away of the carrier 6 may occur.

During normal operation, the controller 2 supplies a given command or instruction to a given stator immediately before the carrier reaches the given stator. When a failure in operation of the stator or the like is detected upon sending of the command, the carrier 6 can no longer be controlled since it is about to reach the given stator. As a result, a run-away of the carrier 6 cannot be prevented.

Figure 3:
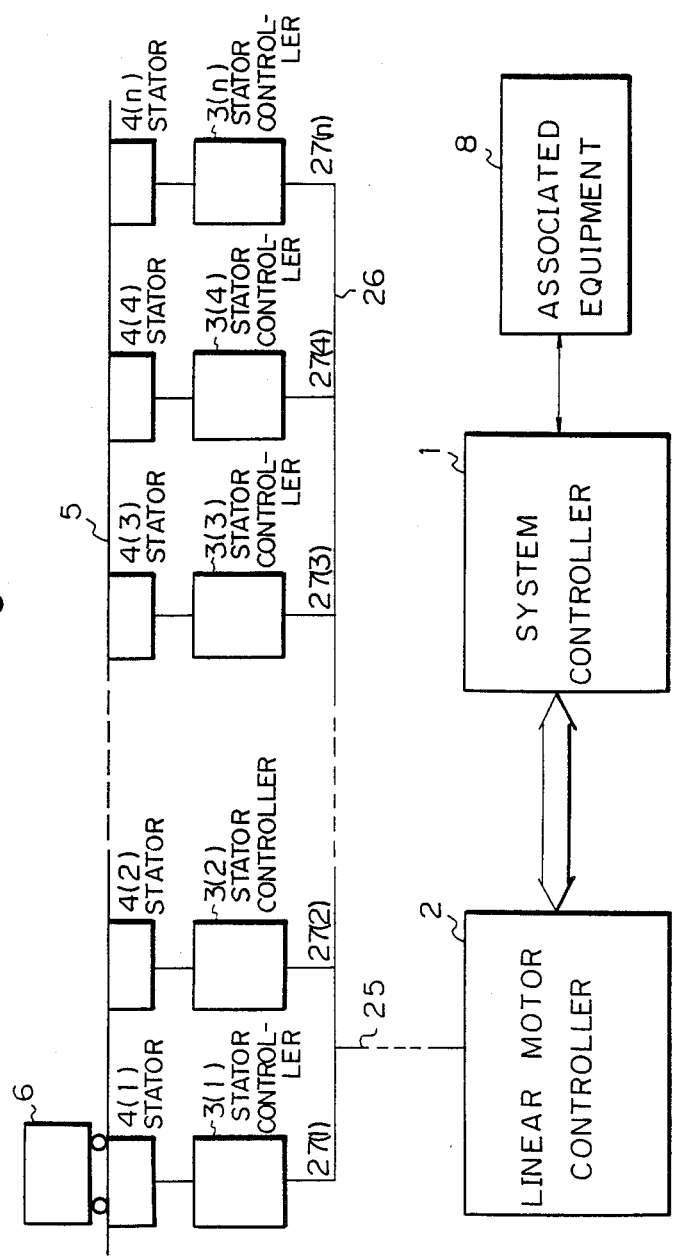
FIG. 3 is a block diagram of a transport control system according to an embodiment of the present invention.

A transport control system with linear motor drive according to an embodiment of the present invention is shown in FIG. 3. Referring to FIG. 3, reference numeral 1 denotes a system controller for controlling the entire system on the basis of a request from, e.g., a teller's counter, as the request source; and 2, a linear motor controller for controlling the respective stators 4(1) to 4(n) in response to transport instructions from the system controller 1. Reference numerals 3(1), 3(2), . . . , and 3(n) denote stator controllers coupled to the stators 4(1) to 4(n), respectively. The stator controllers 3(1) to 3(n) energize the corresponding stators in response to instructions sent through cables 25, 26, and 27, thereby controlling the driving of the carrier 6. Each stator controller 3(1) to 3(n) comprises a microprocessor.

Figure 4:
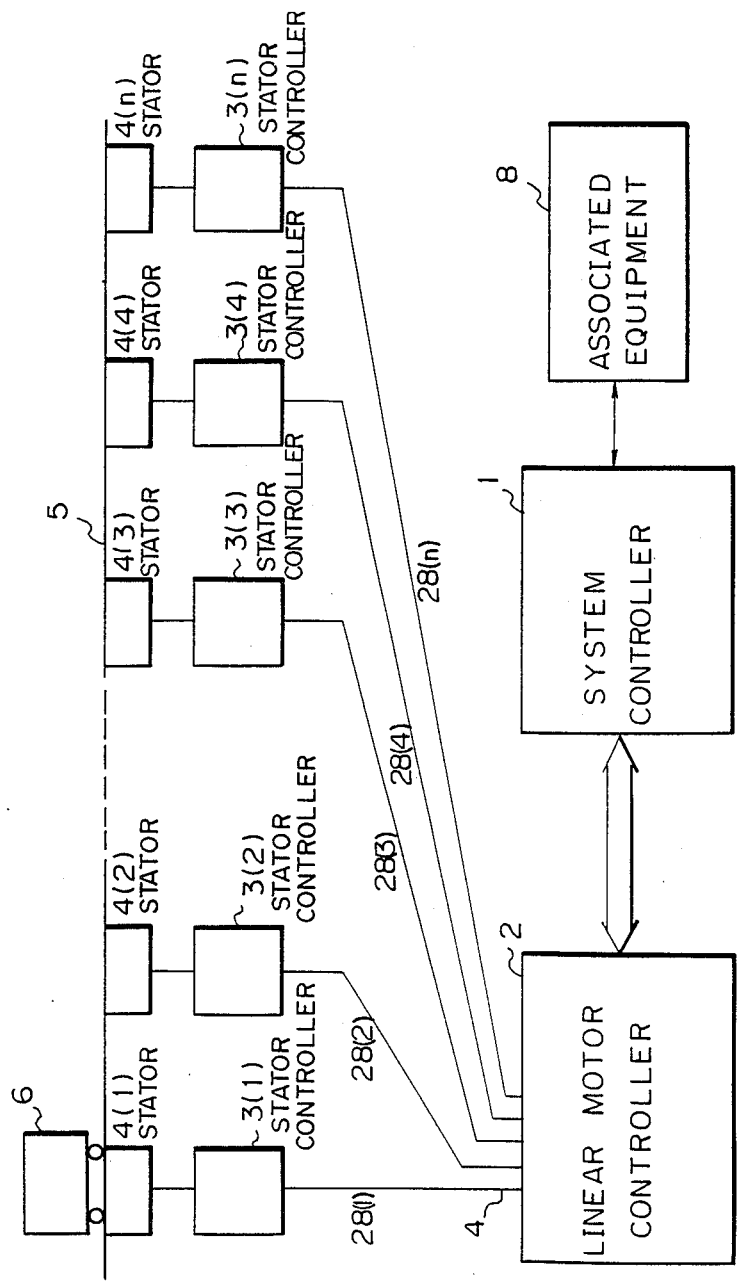
FIG. 4 is a block diagram of a transport control system according to another embodiment of the present invention.

The linear controller 2 is connected to the stator controllers 3(1) to 3(n) in accordance with the multi-drop method shown in FIG. 3, or they may be connected in parallel with each other via cables 28, as shown in FIG. 4. The main feature of the present invention lies in the arrangement wherein the stator controllers 3(1) to 3(n) having a control function are respectively coupled to the stators 4(1) to 4(n), receive instructions and data from the linear motor controller 2, are set in the designated operating modes, and energize the corresponding stators to control the speed of the carrier in the designated operating modes.

The linear motor controller 2 thus sends an operating mode instruction and speed data to each of the stators 4(1) to 4(n). The actual operations of the stators 4(1) to 4(n) are controlled by the stator controllers 3(1) to 3(n), respectively.

Each of the stator controllers 3(1) to 3(n) has, as basic operating modes, a neutral mode for making the corresponding stator inactive, a start mode for energizing the corresponding stator 4(1) to 4(n) to start the carrier, an acceleration/deceleration mode for making the corresponding stator 4(1) to 4(n) accelerate or decelerate the carrier, and a stop mode for stopping the carrier. Each stator controller 3(1) to 3(n) is set in any one of the above basic modes in response to an instruction from the linear motor controller 2.

Each stator 4(1) to 4(n) controls the speed of the carrier 6 in the given operating mode in such a manner that the carrier 6 is smoothly driven from the start position to the stop position. Upon nearing the stop position, the carrier 6 is decelerated and stopped in such a manner that it does not come in contact with the stator at the stop position.

Since the stator controllers 3(1) to 3(n) having a control function are respectively coupled to the stators 4(1) to 4(n), run-away prevention control and speed control can be performed as follows. As described above, a given operating mode can be set by an instruction (command) to perform run-away prevention control. Assume that the stator 4(1) among the four stators 4(1) to 4(4) along the rail-path 5 is defined as the start position, stator 4(4) as the stop position, and the remaining stators 4(2) and 4(3) are used for accelerating/decelerating the carrier 6 as in the conventional linear motor system. Conventionally, the linear motor controller 2 sends the start command STR to the stator 4(1), as shown in FIG. 2(1), to start the carrier 6 from the stator 4(1). After the carrier 6 is started, the controller 2 sends the acceleration/deceleration command SPC to the stator 4(2), as shown in FIG. 2(2), to accelerate or decelerate the carrier 6 at the stator 4(2). As shown in FIG. 2(3), the controller 2 then sends the command SPC to the stator 4(3) to accelerate or decelerate the carrier 6 at the stator 4(3). When the carrier 6 passes by the stator 4(3), the controller 2 sends the stop command STP to the stator 4(4), as shown in FIG. 2(4), thereby stopping the carrier 6 at the stator 4(4). The conventional control operation in FIG. 2 is performed in such a manner that the stators are sequentially controlled by the movement of the carrier 6 along the rail-path. However, in normal operation of a conventional control, if a failure occurs, a run-away of the carrier 6 cannot be prevented. When a failure in operation of an interface between the linear motor controller 2 and the stators 4(2), 4(3) and 4(4) occurs, proper operation may not be carried out if the operating commands are sent to the stators 4(2), 4(3) and 4(4) after the carrier 6 is started from the stator 4(1).

For this reason, control failures may occur in the stators 4(2) to 4(4), or there may be no control at all, resulting in a run-away of the carrier 6.

In normal operation, the controller 2 supplies a given command or instruction to a given stator immediately before the carrier reaches the given stator. When a failure in operation of the stator or the like is detected upon sending of the command, the carrier 6 can no longer be controlled since it is about to reach the given stator, and as a result, a run-away of the carrier 6 cannot be prevented.

However, according to the system shown in FIG. 3, a command is sent to a given stator in advance, the given stator is set in a given operating mode represented by this command, and thereafter the carrier 6 is driven.

Figure 5:
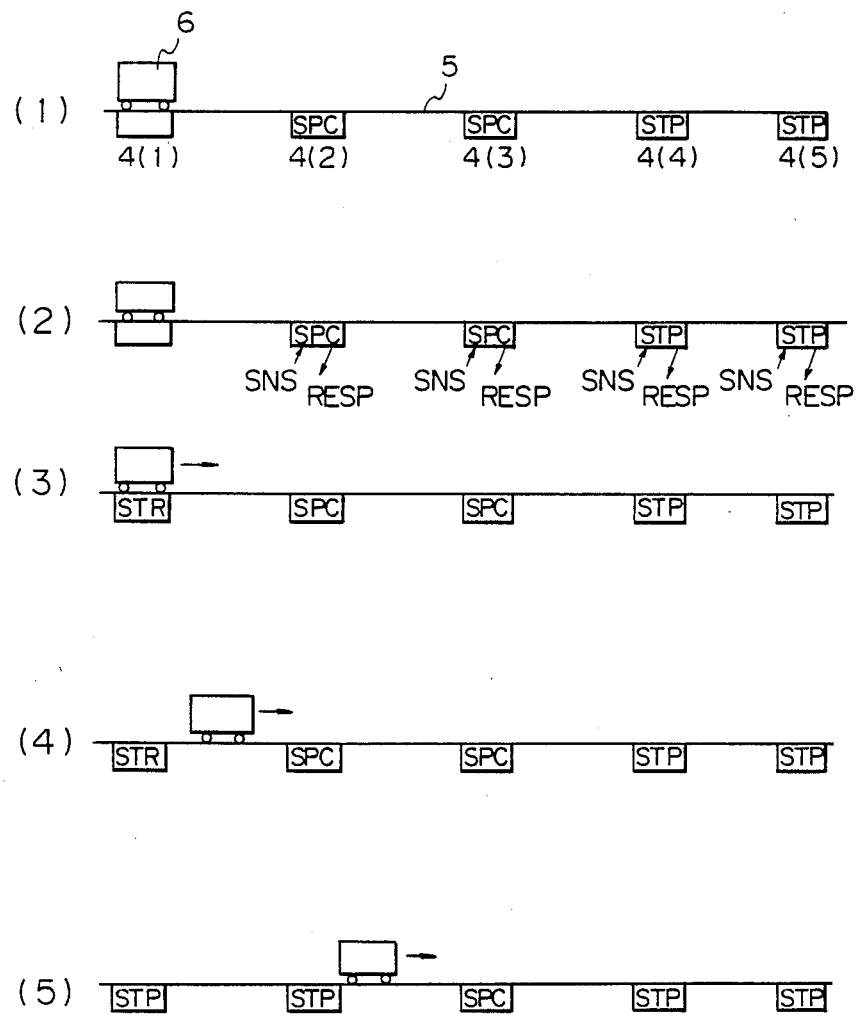
FIG. 5 is a representation for explaining run-away prevention control according to the present invention.

More particularly, as shown in FIG. 5, when a command is supplied from the system controller 1 to the linear motor controller 2, among the stators 4(1) to 4(4) associated with driving the carrier 6, the stators 4(2) to 4(4) (excluding the stator 4(1) as the start position stator) and the stator 4(5) next to the stator 4(4) as the stop position stator receive their respective operating commands. In other words, the linear motor controller 2 sends the command SPC to the stator controllers 3(2) and 3(3) for the stators 4(2) and 4(3) and the stop command STP to the stator controllers 3(4) and 3(5) for the stators 4(4) and 4(5).

As shown in FIG. 5, when the stators 4(2) and 4(3) are operating normally, they are set from the neutral mode to the acceleration/deceleration mode. Similarly, when the stators 4(4) and 4(5) are operating normally, they are set from the neutral mode to the stop mode.

The linear motor controller 2 has means for detecting failures in operation of the stator controllers, including detecting failure of operation of a destination stator in the plurality of stators 4(2) to 4(4) and 4(5). In addition, the linear motor controller 2, in combination with the stators 4(2) to 4(4) and 4(5), has means for detecting an existence of overlap of a portion of the range where the running of the carrier is expected with the portion of the range where the carrier is actually running, and means for detecting obstacles in the rail-path. The structure for the means for detecting obstacles in said rail path could include, as would be known to those skilled in the art, detectors provided along the rail-path which are connected to linear motor controller 2 in a manner similar to the described hereafter for sensors 531–534, the stator motor CPU, and the controller 2. Thus, the linear motor controller 2 can control the start of a carrier on the basis of the result of obstacle detection, absence of failure in operation of a stator controller, and also drive the carrier only when an overlap between the actual running of the carrier and the proposed running of the carrier does not exist.

The linear motor controller 2 sends the commands to check the operation modes of the stators 4(2) to 4(4) and 4(5), as follows.

The linear motor controller 2 sends the command signal SNS to the stators 4(2) to 4(4) and 4(5) to establish the proper operation modes at these stators and to check if these stators have correctly switched to the designated operation modes.

If any one of the stators 4(2) to 4(4) and 4(5) has not switched to the designated operation mode, a failure of the stator or interface is determined and an error is indicated.

When the linear motor controller 2 detects that the stators 4(2) to 4(4) and 4(5) are properly set in the designated operating modes, the controller 2 sends the start command STR to the stator 4(1), as shown in FIG. 5. The stator 4(1) is then switched from the neutral mode to the start mode, thereby starting the carrier 6.

When the carrier 6 is started from the stator 4(1), the stator 4(1) is set to the stop mode STP as shown in FIG. 5. The carrier 6 is sequentially driven and subjected to acceleration/deceleration control. When the carrier 6 passes by the stator 4(2), the stator 4(2) is set to the stop mode STP in the same manner as the stator 4(1), as shown in FIG. 5. Similarly, after the carrier 6 is accelerated or decelerated by the stator 4(3), the stator 4(3) is set to the stop mode STP in the same manner as the stators 4(1) and 4(2). Thus, if the carrier 6 is repelled by any one of the stators 4(2) and 4(3) and driven backwards, it can be stopped since the previous stator is set to the stop mode STP when the carrier 6 has passed that stator, and as a result, a run-away of the carrier 6 can be prevented.

The carrier 6 is stopped by the stator 4(4). If a failure occurs in the stator 4(4), then the carrier 6 is stopped by the stator 4(5). During the above operation, the linear motor controller 2 sends a sense command SNS to the stators 4(1) to 4(4) to check their operating states and monitor the running status of the carrier 6.

Figure 6:
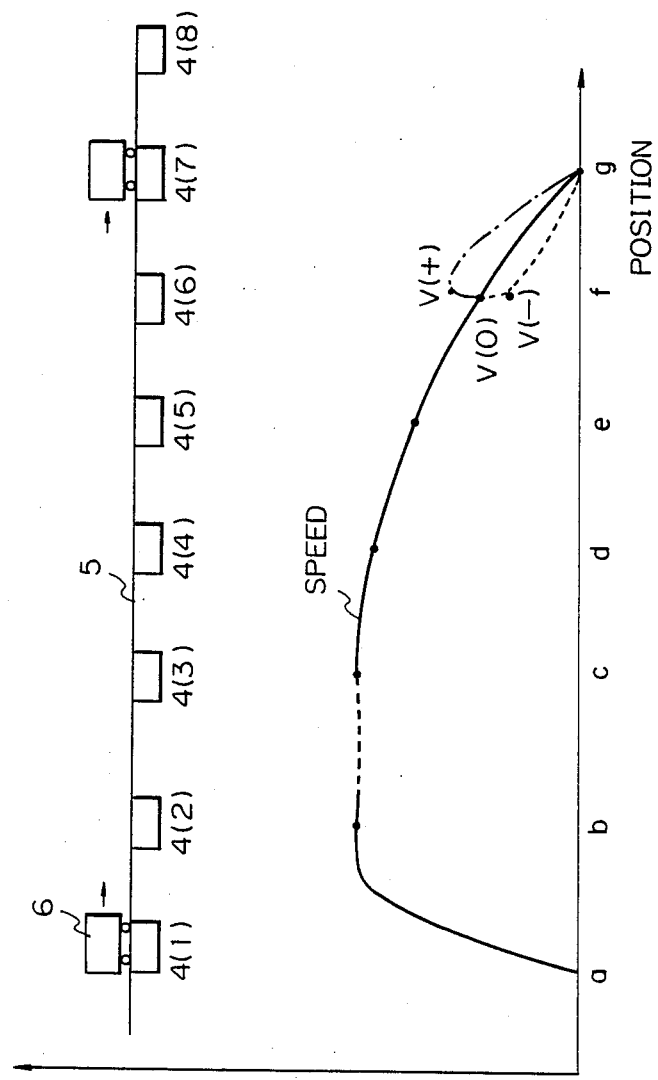
FIG. 6 is a representation for explaining speed control according to the present invention.

Speed control can be performed by the stator controller as follows. For example, as shown in FIG. 6, when the carrier 6 is driven from the stator 4(1) to the stator 4(7), the carrier 6 is started from the stator 4(1) at maximum speed. The carrier 6 then passes by the stators 4(2) and 4(3), still at maximum speed, is then gradually decelerated through the stators 4(4), 4(5), and 4(6), and finally, is stopped at the stator 4(7). Since the carrier 6 must be stopped in such a manner that it does not come in contact with the stator 4(7), the speed of the carrier 6 must be gradually decelerated to a speed at which the carrier 6 can be immediately stopped near the stator 4(7). The speed characteristic curve is set to achieve the above operation, and the linear motor controller 2 controls the stators in accordance with this curve. In practice, when the rail-path comprises a linear path, a curved path, an ascending slope path, or a descending slope path, the required speed of the carrier 6 varies. For example, when a rail-path between the stators 4(6) and 4(7) is a linear portion, as shown in FIG. 6, speed data V(0) is sent to the stator 4(6) so as to set the passing speed of the carrier 6 to V(0). However, when the rail-path comprises a descending slope portion, the speed V(0) is too high and the carrier 6 may be derailed. In this case, the carrier passing speed at the stator 4(6) must be set to V(−) lower than the speed V(0). However, when the rail-path comprises an ascending slope or curved path, the speed V(0) is so low that the carrier 6 may stop of its own accord. Therefore, the carrier passing speed at the stator 4(6) must be set to V(+) higher than the speed V(0). This also can be applied to a rail-path between any two adjacent stators. Therefore, for the above reasons, speed control must be performed in accordance with the shape of the rail-path. To this end, the linear motor controller 2 calculates the instructed speeds, to be sent to the respective stators in accordance with the shape of the rail-paths between every two adjacent stators, on the basis of a basic speed control pattern. This calculated instruction speed data then must be sent to the respective stators. When the rail-path has predetermined start and stop position stators, only an actual speed pattern is determined. However, when the start and stop position stators are not determined and the carrier 6 is to be started from any stator and stopped at any other stator, the linear motor controller must calculate the instructed speeds to be sent to the respective stators on the basis of the basic speed control pattern.

Accordingly, the linear motor controller requires a program for speed calculation and a heavy calculation load is imposed. In addition, speed commands cannot be given to the corresponding stators until the calculation is completed. Therefore, the processing time required from a transport request to actual transport is prolonged, thereby partially degrading the high-speed transport performance as a whole.

As shown in FIG. 7, speed data (a maximum speed that will allow the carrier to pass safely along the rail-path, a minimum speed, and a correction value) for a rail-path shape having a combination of linear, curved, ascending slope, and descending slope paths is prepared. The proper speed data is selected in accordance with the shape of the rail-path portions extending between every two adjacent stators. The linear motor controller 2 supplies a designation value to each stator, in accordance with the basic speed control characteristic curve in FIG. 6, when the carrier 6 is driven. Each of the stator controllers 3(1) to 3(3) determines a control speed in accordance with the above designation value and the speed data. The speed data is set in the following manner. The linear motor controller 2 simultaneously sends a Table 21 (to be described in detail later) of FIG. 7 to the stator controllers 3(1) to 3(n) for all stators, to enable the stators to select the proper data in accordance with the shapes of the rail-path portions extending between every two adjacent stators. Namely, the speed data may be set in such a manner that the linear motor controller 2 selects the proper speed data in accordance with the shapes of the rail-path portions connected to the two ends of each stator on the basis of the Table 21 of FIG. 7.

In this manner, the load of the linear motor controller 2 is decreased and a smooth speed control is carried out.

Figure 8:
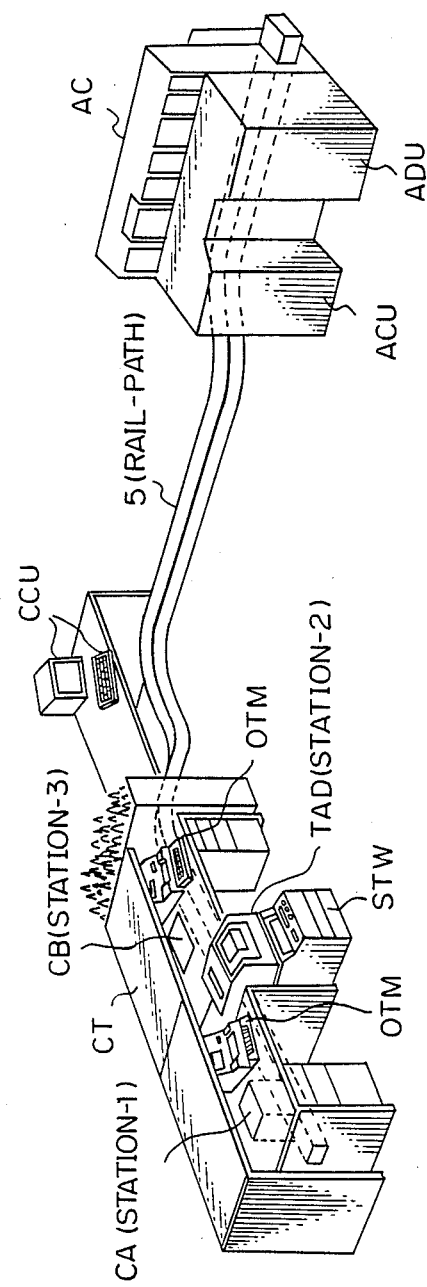
FIG. 8 is a perspective view showing the outer appearance of a system according to an application of the present invention.

FIG. 8 is a schematic view of an application of the present invention, showing a cash transportation system in a bank. Referring to FIG. 8, reference symbol CT denotes a teller's counter at which customers can request a transaction to be made, such as a deposit, withdrawal, or transfer transaction. Reference symbol OTM denotes an on-line teller machine. A teller enters the transaction data requested by a customer at the teller machine OTM. The teller machine OTM has a keyboard, a display, and a printer and is connected to a system controller (not shown). Reference symbol TAD denotes a teller cash reception unit which receives cash inserted by the teller and counts the total amount of cash inserted; STW, a terminal writer for printing transaction data on an inserted passbook; and CA and CB, cash insertion/dispensing ports, respectively. The teller places cash on the carrier 6 driven along the rail-path 5 through the cash insertion/dispensing port CA and removes cash from the carrier 6 through the cash insertion/dispensing port CB. Reference symbol AC denotes a cash reception/dispensing unit which comprises a cash dispensing unit ACU and a cash reception unit ACU. The cash is transported from the cash dispensing unit ADU to the carrier 6 along the rail-path 5 in response to a cash dispensing instruction from the system controller 1 (FIG. 3), and the cash is removed from the carrier 6 to the cash reception unit ADU in response to a cash reception instruction. Reference symbol CCU denotes an consulting unit terminal which is an associated equipment and which comprises a display and a keyboard. A consulting instruction is entered at the terminal CCU, which is supplied to the system controller 1 (FIG. 3), and a consulting result is displayed at the terminal CCU.

Figure 9:
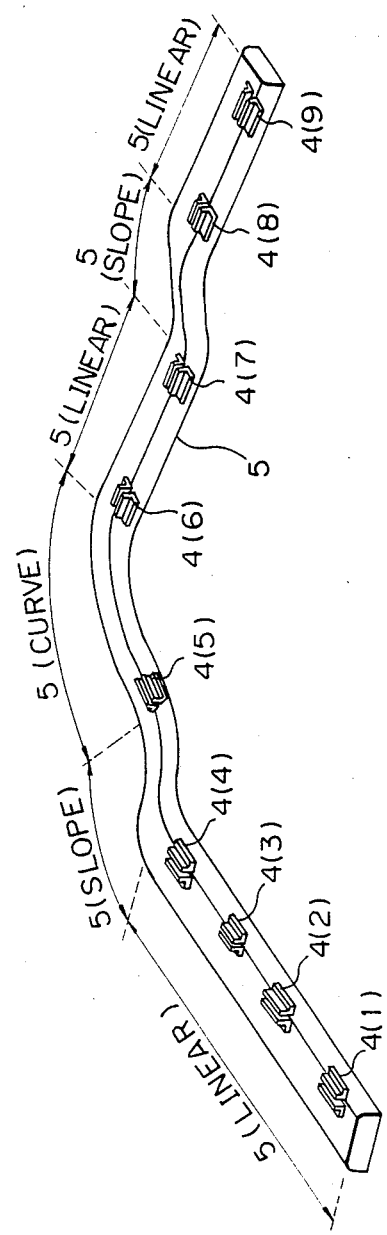
FIG. 9 is a perspective view showing the arrangement of stators in the system application shown in FIG. 8.

The operation of the cash transport system will be described hereinafter. The carrier 6 is driven back and forth between the teller's counter CT and the cash dispensing unit AC so as to transport cash therebetween. When a deposit transaction is to be performed, the carrier 6 carries cash from the cash insertion/dispensing port CA or CB or the teller cash insertion unit TAD and is started along the rail-path 5. The carrier 6 is then stopped at the cash reception unit ADU. The cash reception unit ADU receives the cash from the carrier 6. Thereafter, the carrier 6 returns to the counter CT. However, when a withdrawal transaction is to be performed, the carrier 6 is started from the counter CT and is stopped at the cash dispensing unit ACU. The carrier 6 then receives cash from the ACU unit, is driven along the rail-path 5 and is stopped at a requested cash insertion/dispensing port (station) CA or CB. The teller then removes the cash from the carrier 6. The stations CA and CB are provided with stators coupled to the rail-path 5 so that the carrier 6 can be started, accelerated, decelerated, and stopped by the linear motor controller at the stations CA and CB. FIG. 9 shows the arrangement of stators along the rail-path. The stators 4(1), 4(2), and 4(3) are arranged in such a manner that the carrier 6 can be started from, accelerated or decelerated, or stopped at the cash insertion port CA, the teller cash reception unit TAD, or the dispensing port CB. The stators 4(4), 4(5), 4(6) and 4(7) are arranged to accelerate or decelerate the carrier 6 at sloped and curved portions of the rail-path 5. The stators 4(8) and 4(9) are arranged in such a manner that the carrier 6 can be started from, accelerated or decelerated, or stopped at the cash dispensing unit ACU and the cash reception unit ADU, respectively. The start/stop position stations 4(1), 4(2), 4(3), 4(8) and 4(9) have carrier lift mechanisms (to be described later), respectively.

The rail-path 5 comprises the elements shown in FIGS. 10, 11, and 12. The rail-path 5 shown in FIG. 9 is constituted by a combination of the linear paths 5(LINEAR) of FIG. 10, the curved paths 5(CURVE) of FIG. 11, and the sloped paths 5(SLOPE) of FIG. 12.

FIG. 13 shows the constructions of the carrier and the stator, respectively, as used in the present invention. Reference numeral 6 in FIG. 13 is a perspective view of the carrier 6 and reference numeral 4 in FIG. 13 is a perspective view of the stator 4. Referring to FIG. 13, reference numeral 600 denotes a carrying member for carrying a transported object (cash). The carrying member 600 has a cover to prevent the transported object from being thrown off the carrying member 600. Reference numeral 601 denotes a support plate which supports the carrying member 600; and 602, a rotor plate which is mounted at the lower portion of the support plate 601 and which corresponds to the rotor of the linear motor. Reference numerals 603 and 604 denote guide plates, respectively; 6051 and 6061, upper guide rollers, respectively; and 6052 and 6062, lower guide rollers, respectively. The upper guide rollers 6051 and 6061 and the lower guide rollers 6052 and 6062 are arranged in the guide plates 603 and 604, respectively, and a rail is held therebetween. Reference numerals 6053 and 6063 denote side guide rollers which are brought into rolling contact with the side surfaces of the rail. The side guide rollers are arranged in the guide plate 603. Reference numeral 607 denotes a slit portion formed in the guide plate 603. This slit portion is detected by a sensor (to be described later) to determine the carrier's position and speed. Guide rollers 6051 to 6053 and 6061 to 6063 are also arranged in the guide plate 604.

FIG. 13 also shows a perspective view of a stator, in which reference numerals 410 and 411 denote bases, respectively; and 412 and 413, guide portions, respectively. The guide portions 412 and 413 are spaced apart by a gap into which the rotor plate 602 of the carrier 6 can be inserted in such a manner that there is no contact between them. The guide portions 412 and 413 have core portions mounted thereon, respectively. Reference numerals 414 and 415 denote these coil portions, each of which comprises a driving coil, an aligning coil, and an acceleration/deceleration coil.

The linear motor drive comprising the carrier and the stator shown in FIG. 13 will now be described with reference to FIGS. 14, 15, and 16.

As shown in FIG. 16, a pair of U-shaped rails 51 and 52 are fixed on the left and right sides of the rail-path 5. The stator 4 is disposed between the rails 51 and 52. Four transmitting photoelectric sensors 531, 532, 533, and 534 are mounted on the rail 51 at each stator 4 position. The sensors 531 and 534 are mounted at positions corresponding to the front and rear ends of the stator 4 and detect the slit portion 607 of the carrier 6, to determine whether or not the carrier 6 is arriving at the stator 4 or has passed by the stator 4. The sensors 532 and 533 are arranged at positions for aligning the stator. The outputs from the sensors 531 to 534 are also used for detecting the speed of the carrier 6.

As shown in FIGS. 14 and 15, the upper and lower guide rollers 6051 and 6052 hold the upper portion of the rail 51 in rolling contact, and the side guide roller 6053 is brought into rolling contact with the side surface of the rail 51, thereby guiding and holding the carrier 6 in all directions along and to the rails 51 and 52. In this state, the rotor plate 602 of the carrier 6 is floating between the guide portions 413 and 414 of the stator in a position such that it can receive a magnetic flux from the stator. The slit portion 607 of the carrier 6 is on the same level as that of the sensors 531 to 534.

When the stator is energized, the carrier 6 is started, accelerated, decelerated, or stopped along the rails 51 and 52. At the same time, the position and speed of the carrier 6 are detected by the sensors 531 to 534.

FIGS. 17, 18, 19, and 20 show a carrier lift mechanism, a rail cover mechanism, and a shutter opening/closing mechanism for each of the stators 4(1), 4(2), 4(3), 4(8), and 4(9) shown in FIG. 9.

Figure 17:
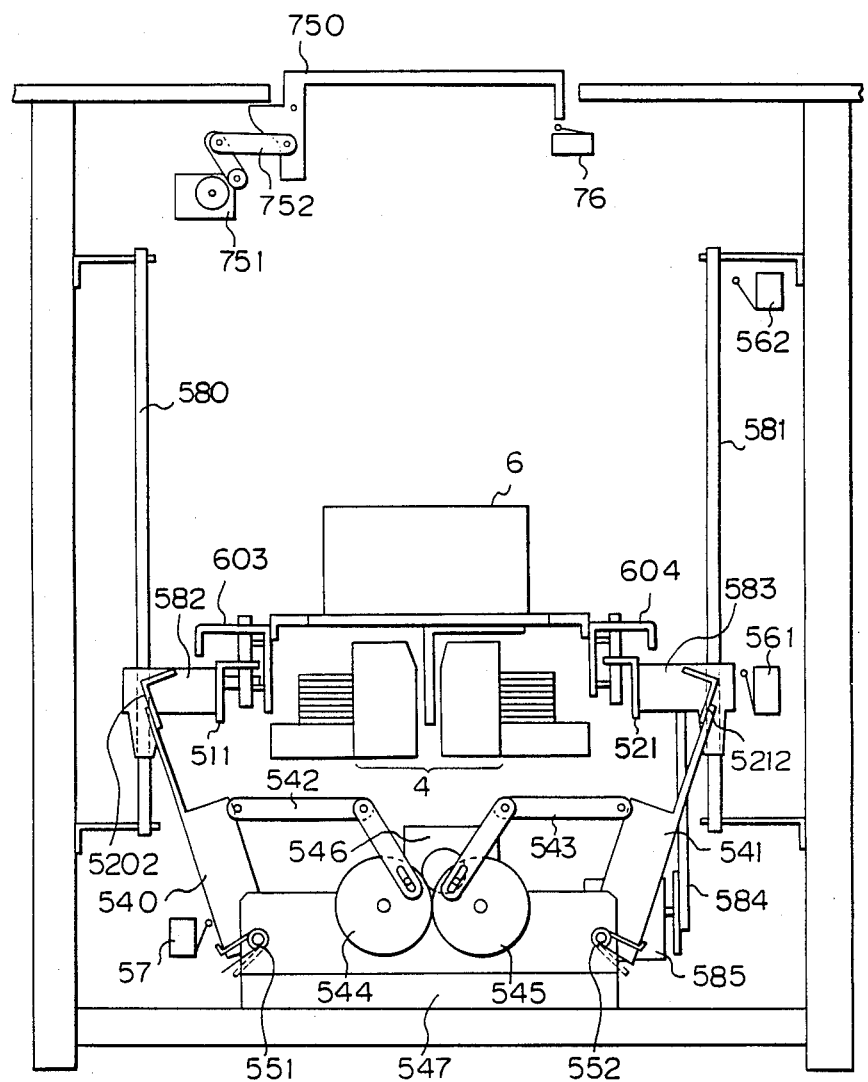
FIGS. 17, 18, 19, and 20 are schematic views for explaining a carrier lift mechanism, a rail cover mechanism, and a shutter opening/closing mechanism in the system application of FIG. 8, respectively.
Figure 19:
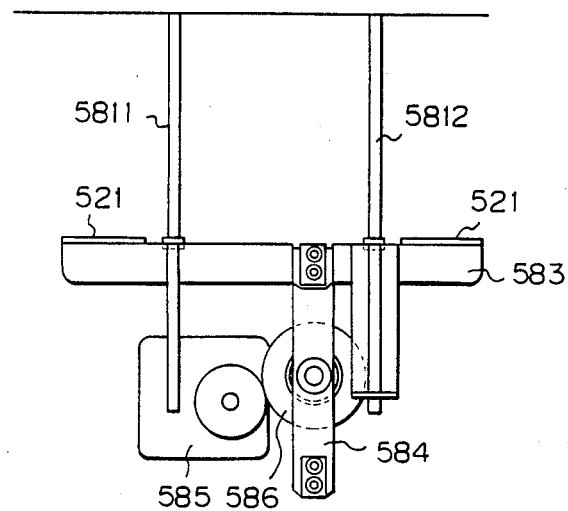
Figure 20:
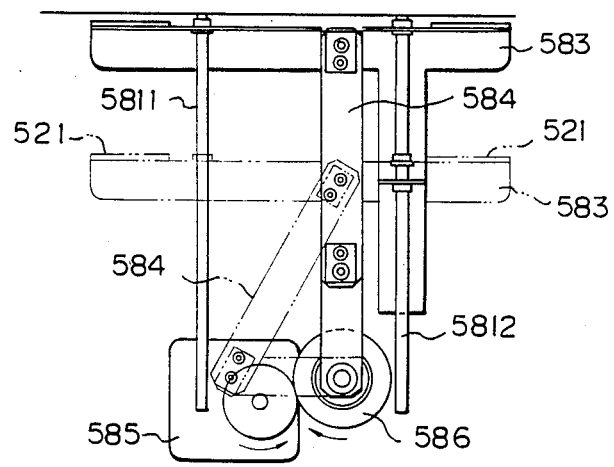

Referring to FIGS. 17, 19, and 20, reference numerals 580 and 581 denote a pair of guide columns for vertically guiding the carrier 6; and 582 and 583, slider blocks which are respectively vertically moved along the guide columns 580 and 581. The slider blocks 582 and 583 have rail elements 511 and 521 as parts of the rails 51 and 52 at their distal ends, respectively. Reference numeral 584 denotes a link mechanism; 585, a lift motor; and 586, a gear. The front end of the link mechanism 584 is connected to the slider block 583, and the rear end of the link mechanism 584 is connected to a shaft of the gear 586. When the lift motor 585 is rotated, the gear 586 is rotated to actuate the link mechanism 584. Reference numerals 561 and 562 denote upper and lower limit detection switches, respectively. These switches 561 and 562 are operated by the slider block 583 to detect the upper and lower limits of the lift mechanism, respectively. The above components constitute the lift mechanism.

Figure 18:
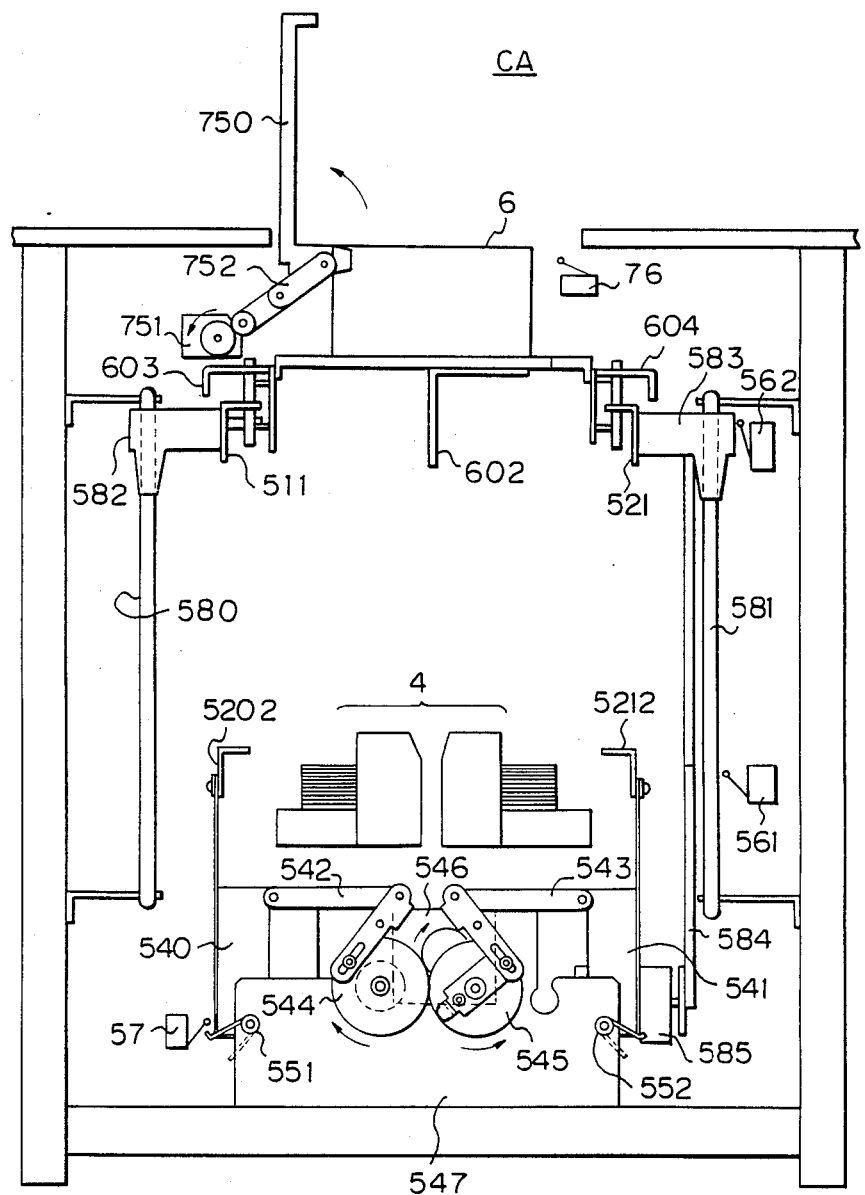

Referring to FIGS. 17 and 18, reference numerals 540 and 541 denote rail cover levers, respectively. The levers 540 and 541 have rail elements 5202 and 5212 at their upper ends and can be pivoted about pivot pins 551 and 552, respectively. Reference numerals 542 and 543 denote link mechanisms for pivoting the rail cover levers 540 and 541, respectively; and 544 and 545, gears, respectively. One end of each of the link mechanisms 542 and 543 is connected to a corresponding one of the gears 544 and 545. Reference numeral 546 denotes a rail cover motor for driving the gear 544; and 547, a frame for supporting the motor 546, the gears 544 and 545 and the rail cover levers 540 and 541. Reference numeral 57 denotes a rail cover opening/closing detection switch which is operated upon pivotal movement of the rail cover lever 540 to detect the positions of the rail elements 5202 and 5212. The above components constitute the rail cover mechanism. The rail elements 511 and 521 are normally withdrawn, as shown in FIGS. 14, 15 and 16. The rail elements 5202 and 5212 compensate for the rail elements 511 and 521 when the rail elements 511 and 521 are lifted by the lift mechanism and are separated from the rails 51 and 52 so that they will not interfere with the movement of the carrier 6, as shown in FIG. 17. However, when only one carrier is in use, the rail elements 5202 and 5212 need not be used.

Reference numeral 750 denotes a shutter corresponding to a cover of the cash insertion/dispensing ports CA and CB; 751, a shutter motor for opening/closing the shutter 750; 752, a link mechanism for opening/closing the shutter 750 upon rotation of the motor 751; and 76, a shutter opening/closing detection switch which is engaged with part of the shutter 750 to detect opening/closing of the shutter 750. The above components constitute a shutter opening/closing mechanism. The shutter opening/closing mechanism is arranged only in each of the stators 4(1) and 4(2) corresponding to the cash insertion/dispensing ports CA and CB.

The operation of the above mechanisms will be described with reference to FIGS. 17, 18, 19, and 20. In the normal state, parts of the rails 51 and 52 are constituted by rail elements 511 and 521, respectively, as shown in FIG. 17. When the carrier 6 is stopped and aligned by the stator, the lift motor 585 is rotated in the direction indicated by the arrow in FIG. 20 from the state of FIG. 19. The gear 586 is rotated in the direction indicated by the arrow in FIG. 20 to actuate the link mechanism 584 and lift the slider blocks 582 and 583 along the guide columns 580 and 581. In FIG. 20, the slider block 583 is shown being moved upwardly along guide columns 5811 and 5812 which form the guide column 581. The carrier 6 is moved together with the rail elements 511 and 521. When the slider block 583 reaches the upper limit, a switch 562 is operated to stop the motor 585. Therefore, the state shown in FIGS. 18 and 20 is achieved. The rail elements 511 and 521 are separated from the rails 51 and 52, respectively. Under this condition, another carrier cannot pass through this stator. For this reason, the motor 546 of the rail cover mechanism is rotated in the direction indicated by arrow in FIG. 18 to rotate the gear 544 and the gear 545 meshed therewith in the directions shown by the arrows. The link mechanisms 542 and 543 are operated to pivot the rail cover levers 540 and 541 about the pivot pins 551 and 552 of FIG. 18 from the state of FIG. 17. The omitted portions of the rails 51 and 52 are thus compensated by the rail elements 5202 and 5212 mounted at the upper ends of the levers 540 and 541, respectively.

When the carrier 6 reaches the upper limit, the motor 751 is rotated to actuate the link mechanism 752, thereby opening the shutter 750, as shown in FIG. 18.

The teller can then insert the transported object in or remove it from the carrier 6. The process from the state of FIG. 18 to that of FIG. 17 is then performed in reverse to return the carrier 6 to and start it on the rails 51 and 52.

FIG. 21 is a detailed block diagram of one of the stator controllers 3(1) to 3(n) shown in FIG. 3. Reference numeral 30 denotes a stator CPU having an internal memory (RAM) 301. The stator CPU 30 exchanges data and commands with the linear motor controller 2 and data and flags with a motor CPU and a mechanism CPU to be described later. The stator CPU 30 serves as a relay CPU. Reference numeral 31 denotes a motor CPU which controls energization of a stator in response to an instruction from the stator CPU 30. The motor CPU 31 has a speed measurement counter 311 and a memory (RAM) 312. Reference numeral 32 denotes a multiplexer responsive to a selection signal SEL to select the outputs from the sensors 531 to 534 for detecting the slit portion 607 of the carrier 6. A selected detection signal is supplied from the multiplexer 32 to the motor CPU 31. Reference numeral 33 denotes a rail-path shape switch at which the operator enters rail-path shape data (linear, curve, ascending slope, descending slope, etc.) in accordance with the shapes of the rail-path portions extending between every two adjacent stators. The input rail-path shape data is fetched by the motor CPU 31. Reference numeral 34 denotes a coil driver network having drives 341, 342, and 343 which are arranged by solid-state relays. The driver 341 applies an AC voltage to an accelerating/decelerating AC coil 4142 of the stator 4 in accordance with a direction (right or left) instruction from the motor CPU 31. The driver 342 drives an aligning single-phase coil 4141 of the stator 4 in response to an alignment command PCMD from the motor CPU 31. The driver 343 drives a damping coil 4143 of the stator 4 in response to a damping command SCMD from the motor CPU 31. Reference numeral 35 denotes an interface circuit having flag portions 351 and 352 for exchanging flags with the stator CPU 30 and registers 353 and 354 for exchanging commands and data with the stator CPU 30. Reference numeral 36 denotes a first bus through which flags, data, and commands are exchanged between the stator CPU 30 and the interface circuit 35. Reference numeral 37 denotes a second bus through which flags, data, and commands are exchanged between the stator CPU 30 and an interface circuit of a mechanism control CPU 382. The mechanism control CPU 382 has an internal memory (RAM) 3821. The mechanism control CPU 382 controls the motors 585, 546, and 751 of the lift, rail cover, and shutter opening/closing mechanisms described with reference to FIG. 17. Reference numeral 381 denotes an interface circuit having flag portions 3811 and 3812 for exchanging flags with the stator CPU 30 through the bus 37, and registers 3813 and 3814 for exchanging commands and data with the stator CPU 30 through the bus 37.

Figure 21B:
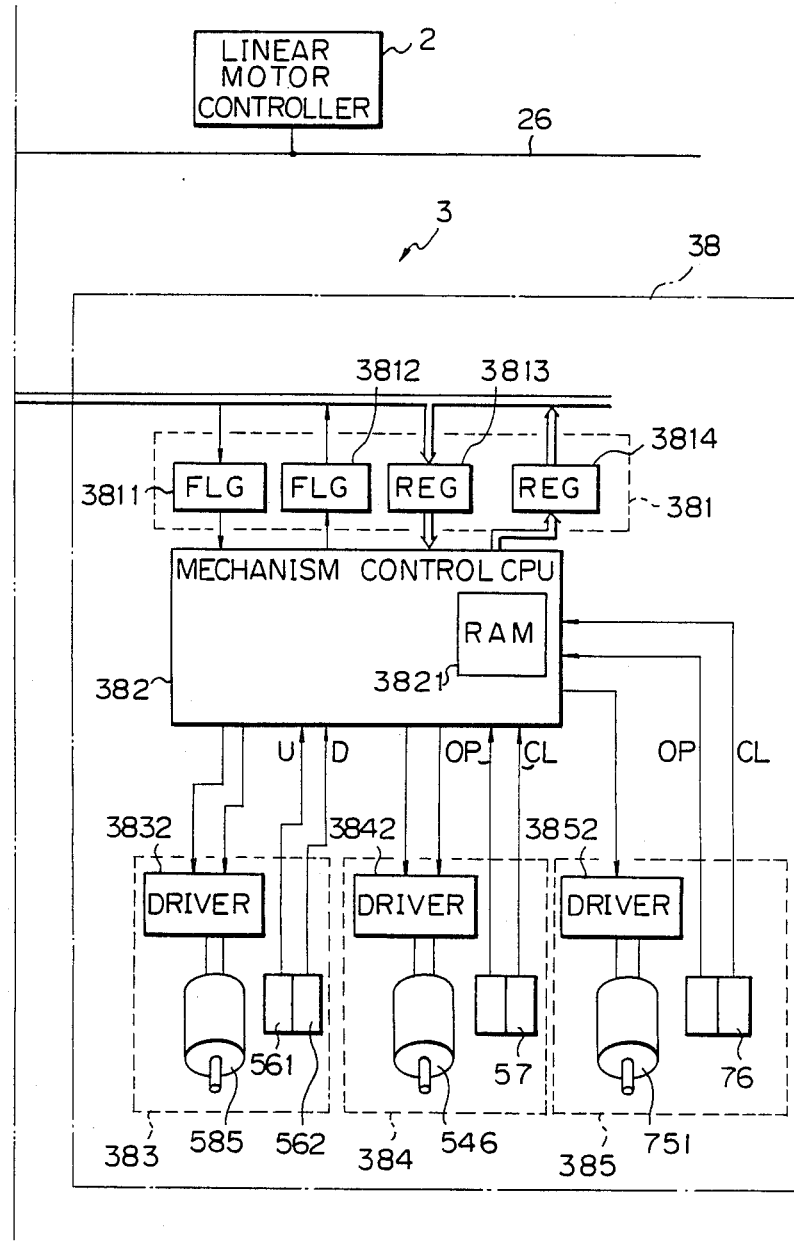

Reference numerals 383, 384 and 385 denote motor and sensing mechanisms respectively comprising motor drivers 3832, 3842 and 3852, motors 585, 546 and 751, and sensors 561/562, 57 and 76 respectively. A mechanism control unit 38 having the above elements shown in FIG. 21B is arranged only in each of the stators 4(1), 4(2), 4(3), 4(8), and 4(9) which are provided with lift mechanisms, as shown in FIG. 9.

The method described with reference to FIG. 3 and the operation of the apparatus shown in FIG. 21 will be described with reference to an input/output signal chart of FIG. 22.

(1) The linear motor controller sends a control data reception command RECV and rail-path shape speed data of FIG. 7 to all stators through cables at the time of system initialization. The speed data includes maximum and minimum speeds for rail-path shape data (i.e., linear, curved, ascending slope, descending slope, curve+ascending slope, and curve+descending slope paths) and a correction value to be used when the next stator is regarded as a stop position stator.

(2) In each stator, the corresponding stator CPU receives the input data, temporarily stores it in the RAM thereof, and then transfers it to the corresponding motor CPU through the bus. The transfer control through this bus is a so-called handshake control. The stator CPU sets a transfer flag in the flag portion 351 and the speed data in the register 353. The motor CPU checks that the flag 351 represents a data transfer from the stator CPU and reads the content of the register 353. Thereafter, the motor CPU sets the flag 352, sends a reception-enable response to the stator CPU through the bus and waits for the next data. The motor CPU sequentially stores the speed data in the Table format of FIG. 7.

In this manner, speed data of the respective rail shapes is stored in the stator controllers of all the stators.

(3) Upon installation of a rail-path in a factory or at a site, the operator sets at the rail-path shape switch the shapes of the rail-paths extending from each end of every two adjacent stators. Therefore, the motor CPU stores the two rail-path shapes of each stator. For example, in the case of the stator 4(5) of FIG. 9, the right-hand path comprises a curved path, and the left-hand path comprises an ascending slope path. Note, the rail-path shapes can be input to the respective stators through signals from the linear motor controller.

When the rail-path shapes are preset, speed data suitable for these rail-path shapes can be selected from the speed table (FIG. 7).

The maximum and minimum speeds of the carrier vary to allow smooth driving along the differently formed rail-paths. For example, if the actual speed of the carrier exceeds the maximum speed for the given path, the carrier will be derailed. On the other hand, if the actual speed of the carrier is lower than the minimum speed for the given path, the carrier will stop of its own accord. Thus, it is preferable for the carrier to run at the maximum possible speed. However, since the carrier is stopped without coming into contact with the rails, deceleration of the carrier must begin at a position two or more stators prior to the stop position stator. Therefore, an ideal speed control characteristic curve must be predetermined, and the carrier must be driven in accordance with that curve.

As described above, since maximum and minimum speeds vary in accordance with the shape of the rail-path, the characteristic curve must be updated upon determination of the start and stop positions. When such data updating is performed for every run of the carrier under the control of the linear motor controller, the volume of processing data becomes large.

Since the speed data table is sent to the respective stator portions, each stator selects from the speed data table the maximum and minimum speeds respectively corresponding to the rail-path shape thereof. The linear motor controller sends only designation speed data derived from the ideal speed control characteristic curve, that is, only data of optimum velocities regarding a predetermined ideal rail-path (a straight rail-path for presuming an ideal form for a rail-path) is sent to the stator portions. Then each stator selects the most suitable maximum and minimum speeds for its particular portion of the rail-path. With this arrangement, the processing load of the linear motor controller need not be increased, and each stator can automatically select the appropriate maximum and minimum speeds which correspond to the rail-path shape in its particular portion, thereby preventing the carrier from being derailed or stopping of its own accord. In addition, the carrier can be controlled in accordance with the basic speed control characteristic curve.

(4) When a transport instruction is sent from the system controller to the linear motor controller, the carrier accelerating/decelerating stators receive the command SPC. For example, as shown in FIG. 6, when the stators 4(1) and 4(7) are defined as the start and stop position stators, respectively, the linear motor controller supplies the speed data SVC to the stators 4(2), 4(3), 4(4), 4(5), and 4(6). This speed data SVC is derived from the basic speed control characteristic curve of FIG. 6.

The respective stator CPUs of the stators 4(2) to 4(6) receive the command SPC and the speed data SV through the cable. The received data is transferred to the motor CPU through the bus and the interface circuit in the manner described above.

The motor CPU has four modes: the neutral mode in which there is no control carried out; the acceleration/deceleration mode for accelerating or decelerating the carrier; the start mode for starting the carrier; and the stop mode for stopping the carrier. Any one of the modes is set in response to an external command.

When the motor CPU receives the command SPC from the stator CPU, the motor CPU is set from the neutral mode to the acceleration/deceleration mode.

When the motor CPU is set n the acceleration/deceleration mode, an acceleration/deceleration mode response signal is supplied from the motor CPU to the stator CPU through the interface circuit and the bus. At the same time, the speed data SVC is stored in the RAM of the motor CPU.

The linear motor controller sends the sense command SNS to the acceleration/deceleration stators 4(2) to 4(6) through the cable to read the operating mode of the motor CPU. The command SNS is supplied to the stator CPU, and the mode is acknowledged by a signal sent as a response to the linear motor controller through the cable. The linear motor controller detects that the stators 4(2) to 4(6) are set in the designated operating mode (i.e., the acceleration/deceleration mode) in accordance with this response.

(5) The linear motor controller sends the stop command STP to the stop stator (4(7) in FIG. 6) and the next stator (4(8) in FIG. 6). The stator CPUs of the stop stators 4(7) and 4(8) receive the command STP which is then transferred to the corresponding motor CPUs. When the motor CPUs are normal, their stators are set from the neutral mode to the stop mode. This operating mode is signalled from the motor CPUs to the corresponding stator CPUs in the same manner as described above.

According to the method of FIG. 3, the command STP is sent to the stator 4(8) next to the stop stator 4(7) in FIG. 6). The stator 4(8) is thus also set in the stop mode. Thus, if a failure occurs in the stator 4(7), the carrier can be stopped at the next stator 4(8), thereby preventing a run-away of the carrier.

If the stators (e.g., 4(8), 4(9), . . . ) next to the stop stator are also set in the stop mode, the reliability of the system can be further improved.

The linear motor controller sends the command SNS to the stop stator(s), and the operating mode signal is sent as a response to the stator controller(s) through the cable(s). Therefore, the linear motor controller can detect that the designated stators are set in the stop mode.

In this manner, commands are sent to the acceleration/deceleration and stop stators to set them in the designated operating modes before the carrier is actually driven. At the same time, the linear motor controller checks that these stators are set in the designated modes. This control is based upon a normal status of the stators and the interface circuit including the cables, and that the stators are set in the designated operating modes. Therefore, run-away of the carrier caused by a failure in operation of the interface and the stators can be prevented in advance.

(6) When the linear motor controller completes the above check, it sends the command STR (including a running direction) to the start stator (4(1) in FIG. 6). The stator CPU of the start stator receives the command STR through the cable and sends a signal acknowledging receipt of the command STR to the corresponding motor CPU in the same manner as described above. The operating mode of the motor CPU is then set from the neutral mode to the start mode.

When the motor CPU is set in the start mode, the carrier is started in the manner described below.

Note, the start stator is automatically set from the start mode to the stop mode after the carrier is started.

(7) Thereafter, the carrier is driven along the rail-path and is subjected to acceleration/deceleration control at acceleration/deceleration stators in a manner to be described later. At the same time, the linear motor controller sends the command SNS to the respective stators associated with driving the carrier, through the cables, and detects the operating status of each stator. The linear motor control checks whether or not the carrier has passed the stators and has stopped at the given stator. Note, the acceleration/deceleration stators are automatically set in the stop mode when the carrier has gone past.

In this manner, the start and acceleration/deceleration stators are set in the stop mode when the corresponding control operations are completed. Thus, even if the carrier is repelled by a stator next to a given stator, whose mode is switched to the stop mode, and is returned to the given stator, the carrier can be stopped, thereby providing a transport system with high reliability. The start mode, the acceleration/deceleration mode, and the stop mode will be described with reference to flow charts of FIGS. 23, 24, 25, 26, and 27.

Figure 23:
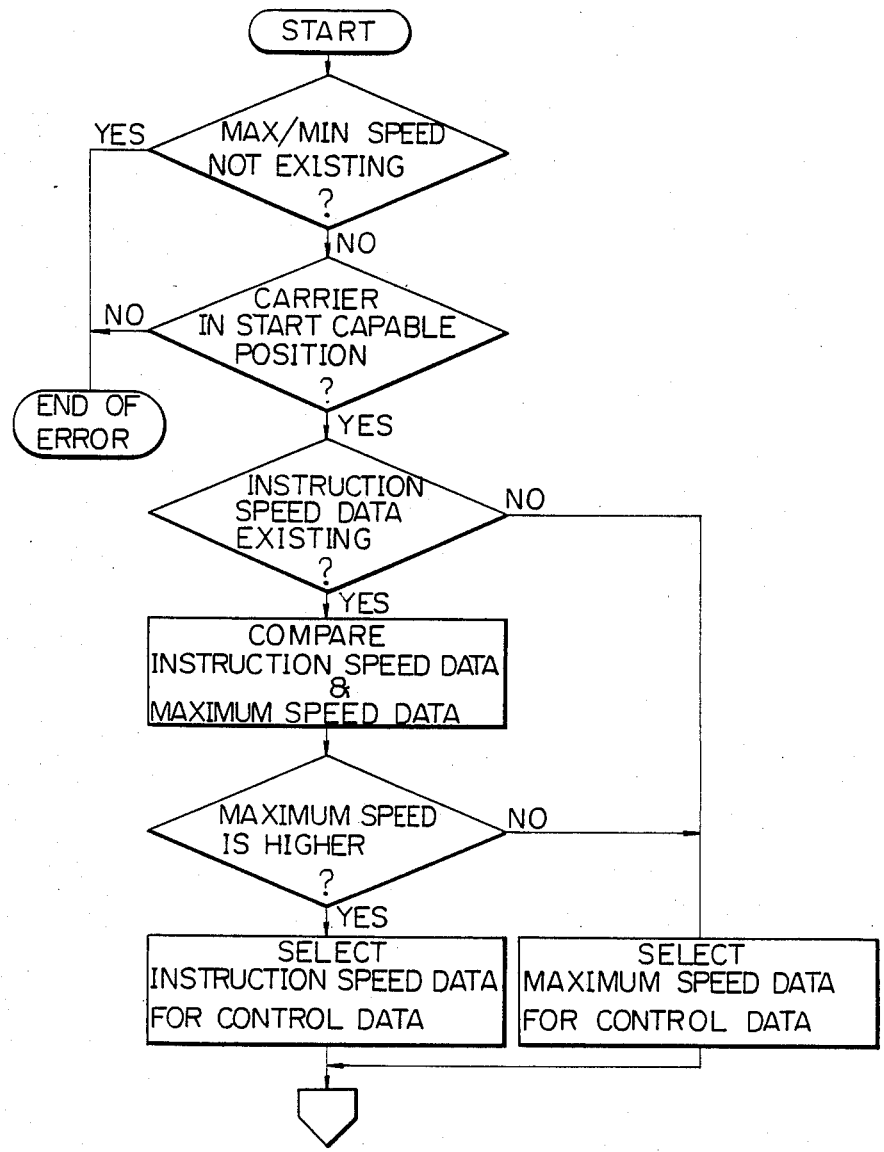
FIGS. 23 and 24, respectively, are flow charts for explaining the start mode.
Figure 24:
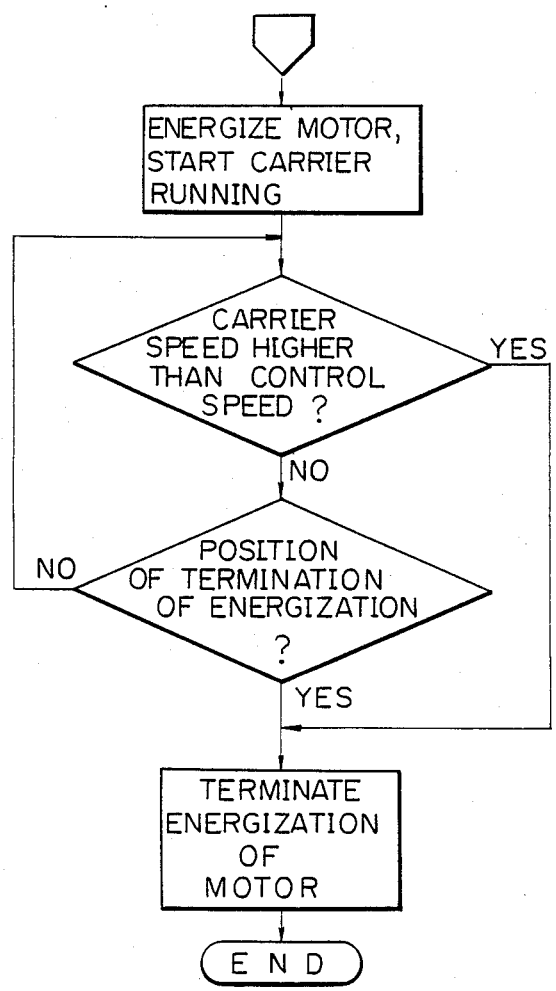

(A) The start mode will be first described (FIGS. 23 and 24).

(A-1) When the motor CPU is set in the start mode in step (6) above, it checks the content of the memory 312 thereof to ascertain whether or not the speed data (maximum and minimum speed data) is set. If the motor CPU determines that the speed data is not set (i.e., the speed data is absent), the motor CPU generates an error signal and the flow is ended. However, when the motor CPU determines that the speed data is set, the motor CPU checks whether or not the carrier is located at the start position. When the carrier is positioned between the sensors 532 and 533 which generate slit portion detection signals, the motor CPU determines that the carrier is positioned in the start position. Therefore, the motor CPU checks the outputs from the sensors 532 and 533. When the outputs are actually generated therefrom, the motor CPU determines that the carrier is positioned in the start position and is ready for starting. Otherwise, the motor CPU determines that the carrier is not ready for starting, and generates an error signal, thereby ending the flow.

(A-2) When the motor CPU determines that the carrier is positioned in the start position, the motor CPU determines a control speed. The motor CPU checks the memory 312 to determine whether or not designated speed data SVc is stored. As described with reference to step (6) above, the linear motor controller sends the command STR and the input speed data SVc, if needed, to the motor CPU through the stator CPU. When the start speed data is received by the motor CPU, it stores the data in the memory 312. Therefore, when the motor CPU checks the content of the memory 312 and detects the designated speed data SVc, the motor CPU checks whether or not the carrier can be started at the speed SVc.

For this purpose, the motor CPU compares the designated speed data SVc with the maximum speed data $V_{MAX}$. More specifically, the motor CPU reads out the rail-path shape along the running direction from the rail-path shape switch and the maximum speed data $V_{MAX}$ of the readout rail-path shape data from the Table (FIG. 7) of the memory 312. The motor CPU compares the speed data SVc with the readout maximum speed data $V_{MAX}$.

Figure 28:
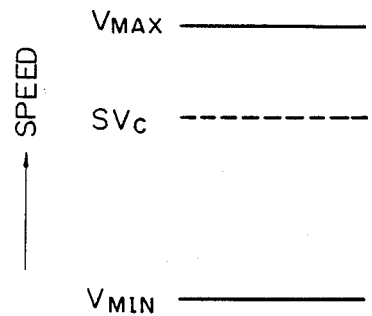
FIG. 28 is a graph for explaining speed control determination.

When the motor CPU determines that the maximum speed data $V_{MAX}$ is larger than the input speed data SVc, i.e., if condition $V_{MAX} > SVc$ (FIG. 28) is established, the carrier will not derail at the start speed SVc. The motor CPU thus determines the input speed data SVc as the control speed data, and the control speed data is set in the memory.

(A-3) However, when the input speed data SVc is absent (no speed data is entered), or when the input speed data SVc is equal to or larger than the maximum speed data $V_{MAX}$ (i.e., when condition $SVc \geq V_{MAX}$ is established), the maximum speed data $V_{MAX}$ is determined as the control speed data and is set in the memory.

(A-4) When the control speed is determined in the manner described above, the motor CPU energizes the motor. More specifically, the motor CPU supplies a right or left drive signal to the driver 341 in accordance with a running direction of the carrier, and the coil 4141 is energized. As a result, the carrier is started.

(A-5) The motor CPU detects a speed of the carrier in accordance with the outputs from the sensors 531 to 534, since the number of pulses from the sensors 531 to 534 which cross the slit portion of the carrier is counted by the counter 311. For example, if the carrier is started toward a certain direction (i.e., to the right direction) from the sensor 533 to the sensor 534. In this case, an output is generated from the sensor 533, so that the motor CPU supplies the selection signal SEL to the multiplexer to select the output from the sensor 533. The output pulses are counted by the counter 311 to detect the current speed of the carrier. In other words, when the leading edge of the slit portion of the carrier reaches the sensor 534, which then generates an output, the motor CPU fetches this output and supplies the selection signal SEL to the multiplexer to select the output from the sensor 534. These output pulses are counted by the counter 311 to detect the current speed of the carrier.

The motor CPU counts the number of output pulses from the multiplexer to detect the current position of the carrier.

(A-6) After the above-mentioned energization is performed under the control of the motor CPU, the motor CPU detects the actual speed of the carrier in accordance with the count of the counter 311 and compares the actual speed with the control speed. When the actual speed is lower than the control speed, the position of the carrier is detected in response to the output pulses from the multiplexer, and the motor CPU checks whether or not the carrier has reached a deenergization position.

(A-7) When the carrier has not reached the deenergization position, energization is continued, and the flow returns to step (A-6).

(A-8) However, when the actual speed is higher than the control speed, the motor CPU causes the driver 341 to stop generating the drive signal, to deenergize the coil 4142, even if the carrier has not reached the deenergization position, thereby terminating the start mode.

When continued energization of the coil 4142 is not necessary, even if the carrier has not reached the deenergization position, the coil 4142 is deenergized. This means that the carrier has been started before it reached the control speed under start control.

Figure 27B:
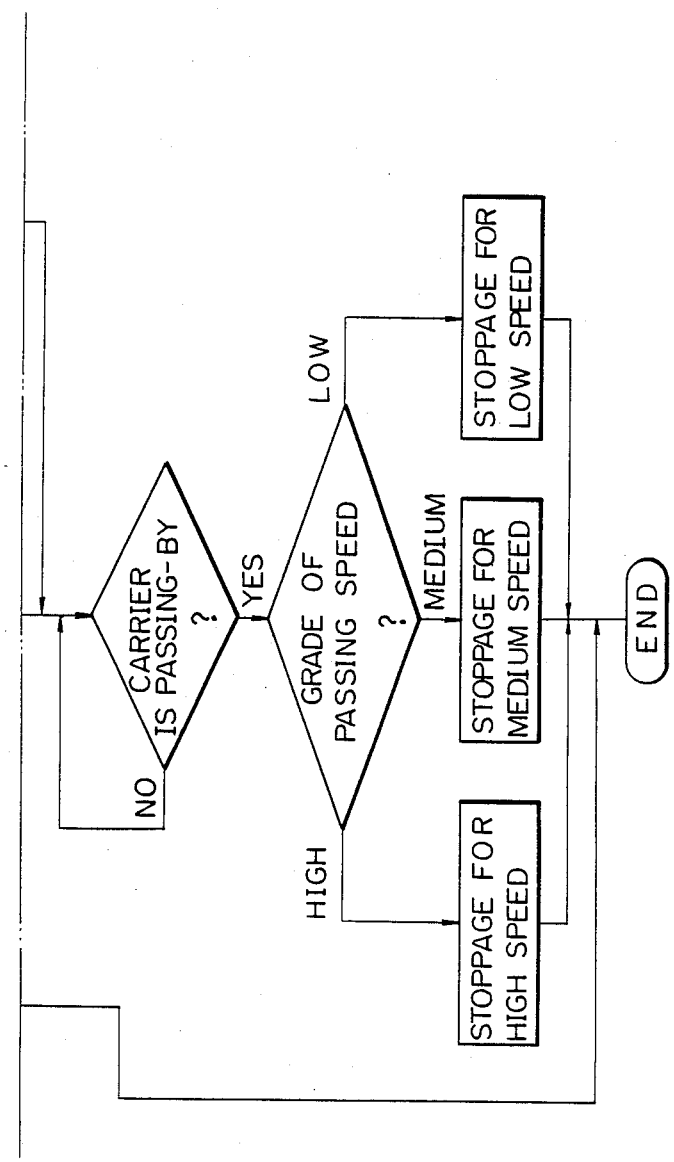

In this manner, in the start mode, the control speed is determined immediately after the motor CPU receives the start command STR. The coil 4142 is energized until the carrier reaches the control speed. When start control is completed, the stop mode described with reference to FIG. 27 is initiated.

Figure 25B:
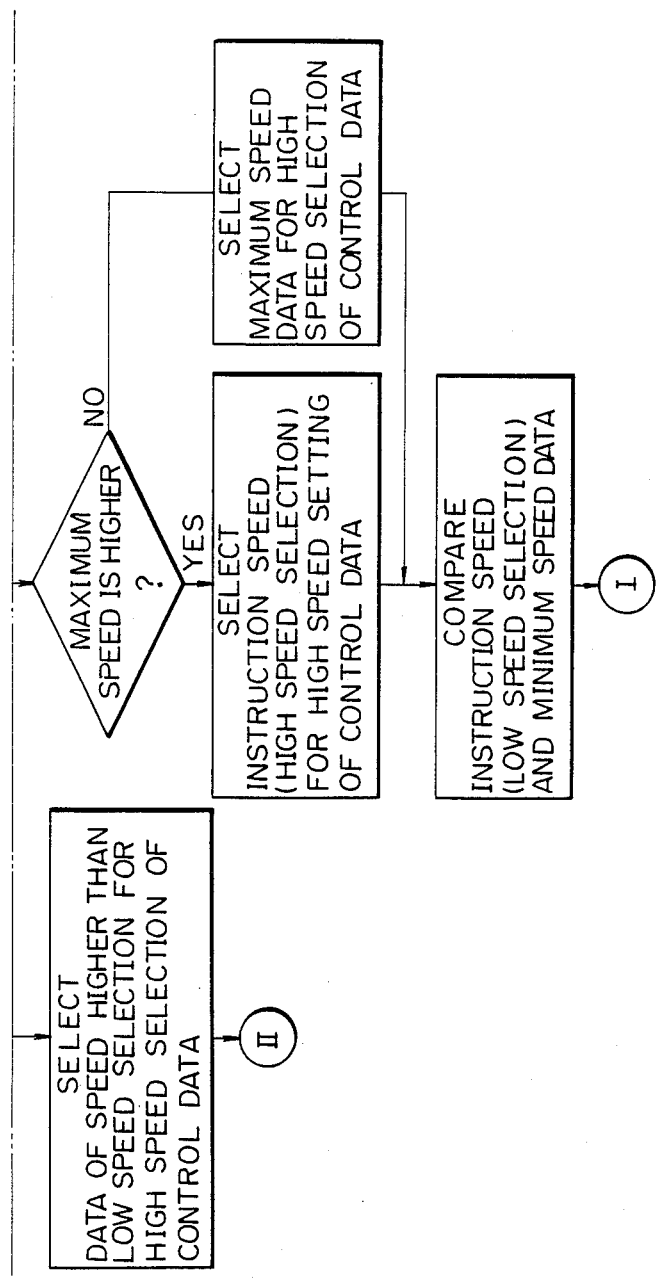
Figure 26B:
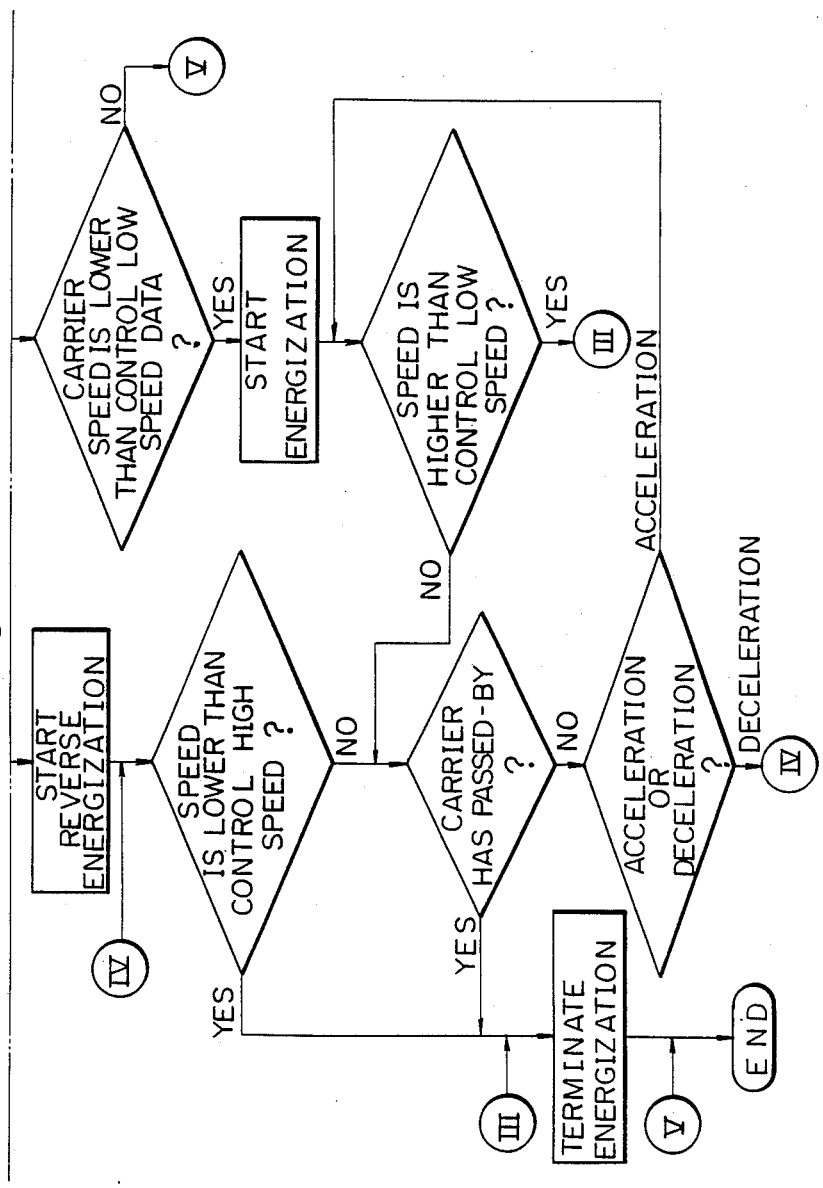

(B) The acceleration/deceleration mode will be described (FIGS. 25 and 26).

(B-1) When the motor CPU is set in the acceleration/deceleration mode in the above-mentioned step (4), the motor CPU checks whether or not the carrier is located within an area of the stator in accordance with the outputs from the sensors 531 to 534. When the carrier is positioned above the corresponding stator, the motor CPU generates an error signal, and the flow is ended.

(B-2) However, when the carrier is not positioned above the corresponding stator, the motor CPU determines a control speed.

In other words, the motor CPU checks if a stator next to the corresponding stator is a stop position stator. The linear motor controller sends the command SPC with a flag to the stator immediately preceding (4(6) in FIG. 6) the stop stator. The motor CPU decodes the command SPC with a flag and determines whether or not the corresponding stator is the stator immediately preceding the stop stator.

When the motor CPU determines that the corresponding stator is the immediately preceding stator, a correction value is read out from the speed table of the memory 312 in accordance with the rail-path shape data entered at the rail-path shape switch. The correction value is set as the control speed. Note, the correction value represents a carrier passing speed at a stator so as to cause the speed near the stop stator to fall within a predetermined value. The correction value is sent from the linear motor controller to the stator CPU at the time of system initialization to accurately control the speed near the stop stator.

(B-3) However, when the motor CPU determines that the corresponding stator is not the stator immediately preceding the stop stator, the motor CPU checks the content of the memory 312 thereof to determine whether or not the designated speed data SVc is stored. When the maximum speed is designated, the linear motor controller does not flag the command SPC with the designated speed data. When the designated speed data SVc is not detected, the motor CPU determines that the maximum speed is designated.

In this case, the motor CPU reads out the maximum speed data $V_{MAX}$ from the speed table of the memory 312 in accordance with the input rail-path shape from the rail-path shape switch. The low speed of the control speed range is given as the maximum speed $V_{MAX}$, and the high speed of the range is given as a speed $V_{MAX}+$ higher than the maximum speed $V_{MAX}$.

(B-4) However, when the speed data SVc is detected by the motor CPU, the maximum speed data $V_{MAX}$ is read out from the speed table of the memory 312 in accordance with the rail-path shape preset by the rail-path shape switch. The motor CPU then compares the speed data SVc with the maximum speed data $V_{MAX}$.

When the motor CPU determines that the maximum speed data $V_{MAX}$ is larger than the speed data SVc, i.e., condition $V_{MAX} > SVc$ (FIG. 28) is established, the speed data SVc is given as the control speed data since the carrier will not derail at the speed SVc. The speed SVc is regarded as the high speed of the control speed range.

However, when the motor CPU determines that the speed data SVc is equal to or larger than the maximum speed data $V_{MAX}$, i.e., condition $SVc > V_{MAX}$ is established, the maximum speed data $V_{MAX}$ is given as the high speed of the control speed data.

In order to determine the low speed of the control speed data, the motor CPU reads out the minimum speed data $V_{MIN}$ from the speed table of the memory 312 in accordance with the rail-path shape data from the rail-path shape switch. The motor CPU then compares the speed data SVc with the minimum speed data $V_{MIN}$.

When the motor CPU determines that the minimum speed data $V_{MIN}$ is smaller than the speed data SVc, i.e., if condition $SVc > V_{MIN}$ (FIG. 28) is established, the carrier can pass the next stator without stoppage even if the carrier is started at the speed SVc. Therefore, the speed SVc is given as the low speed of the low speed data.

However, when the motor CPU determines that the speed data SVc is equal to or smaller than the minimum speed data $V_{MIN}$, i.e., if condition $SVc < V_{MIN}$ is established, the minimum speed $V_{MIN}$ is regarded as the low speed of the control speed data.

(B-5) When the control speed data is determined in steps (B-2), (B-3) or (B-4), the carrier is set in the wait mode.

The motor CPU monitors the output from the sensor 531 or 534 and checks whether or not the carrier has entered the corresponding stator area. When the motor CPU detects that the carrier has entered the corresponding stator area in accordance with the output from the sensor 531 or 534, the motor CPU detects an entrance speed of the carrier. In the same manner as in the step (A-4) in the stop mode, the output from the sensor 531 or 534 is selected by the multiplexer and its pulse width is counted, thereby detecting an actual speed of the carrier.

(B-6) The motor CPU compares the entrance speed with the high speed of the control speed data. When the entrance speed is higher than the high speed of the control speed data, the motor CPU causes the driver 341 to supply an inverted drive signal to the coil 4142 to decrease the actual speed to the high speed of the control speed data.

(B-7) During the above operation, the motor CPU detects the actual current speed of the carrier. When the actual speed is lower than the high speed of the control speed data, the coil 4142 is deenergized.

(B-8) However, when the actual speed is not lower than the high speed of the control speed data, the output pulses from the multiplexer are counted by the counter of the motor CPU to detect whether or not the carrier has passed the sensor position (i.e., the position of the sensor 534 or 531). When the current position of the carrier has reached the sensor position, the color 4142 is deenergized.

(B-9) However, when the motor CPU determines that the carrier has not reached the sensor position, the motor CPU checks whether the acceleration or deceleration mode is initiated. When the motor CPU determines that the deceleration mode is set, the flow returns to step (B-7). Otherwise, the flow advances to step (B-11).

(B-10) In step (B-6), when the actual entrance speed is lower than the high speed of the control speed data, the motor CPU compares the actual entrance speed with the low speed of the control speed data. When the actual entrance speed is higher than the low speed of the control speed data, the actual entrance speed falls within the range between the high and low speeds of the control speed data, and thus the acceleration/deceleration control need not performed. In this case, the coil 4142 is not energized, and the flow is ended.

However, when the actual entrance speed is lower than the low speed of the control speed data, the motor CPU energizes the coil 4142. More specifically, the motor CPU supplies a drive signal to the driver 341 which then energizes the coil 4142, thereby accelerating the carrier.

(B-11) During the above operation, the motor CPU detects the actual speed of the carrier to check whether or not the actual speed has become higher than the low speed of the control speed data. If the actual speed is higher than the low speed, the coil 4142 is deenergized, and the flow is ended.

However, when the actual speed is not higher than the low speed of the control speed data, the flow returns to step (B-8) wherein the carrier is accelerated. In the acceleration/deceleration mode, the control speed data is determined after the command SPC is received. The given stator waits for the entrance of the carrier, and when the carrier enters, it is driven in accordance with the actual speed thereof. When the acceleration/deceleration control is completed, the stop mode is initiated as will be described with reference to FIG. 27 below.

(C) Next, the stop mode will be described (FIG. 27).

(C-1) When the motor CPU is changed to the stop mode as in the above-described step (4), the motor CPU checks whether or not the carrier is positioned above the corresponding stator in accordance with outputs from the sensors 531 to 534. When the carrier is actually positioned above the corresponding stator, the motor CPU causes the drivers 342 and 343 to drive the coils 4141 and 4143, and the flow is ended.

Figure 29:
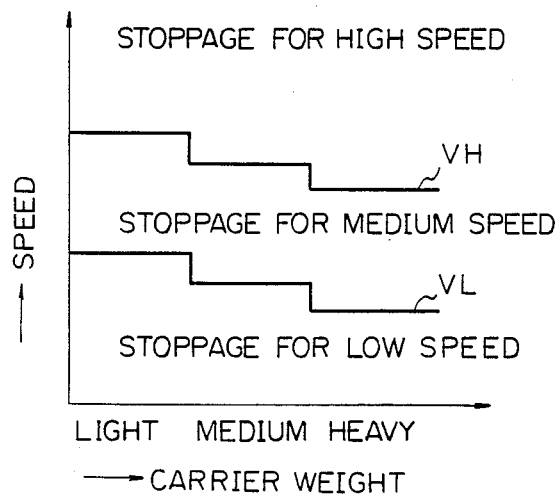
FIG. 29 is a graph for explaining stop conditions.

(C-2) However, when the carrier is not positioned above the corresponding stator, the motor CPU checks whether or not the discriminating speed data is stored in the memory 312. The discriminating speed data is given to change the stop control conditions of different weights since the forces required for stopping the carrier vary in accordance with the entrance speed as a function of carrier weight, as shown in FIG. 29. Threshold speed data between a high-speed stop region and a middle-speed stop region is given as middle/heavy weight discriminating speed data, and threshold speed data between middle-speed stop region and low speed region is given as middle/light weight discriminating speed data. In normal operation, this discriminating speed data is sent together with the speed data described in step (1). The transmitted data is stored in the memory 312. When an article placed on the carrier is light or heavy, the linear motor controller sends the corresponding discriminating speed data to the stop command STP.

When the discriminating speed data is stored in the motor CPU, the data is set as the control stop data. However, if not, the standard discriminating speed data previously sent to the motor CPU is stored as the control stop data.

(C-3) When the control stop data is set in the manner described above, the carrier is set in the entrance wait mode. The motor CPU monitors the output from the sensor 531 or 534 and checks whether or not the carrier enters above the stator. When the motor CPU detects the entrance of the carrier in accordance with the output from the sensor 531 or 534, the motor CPU detects the entrance speed of the carrier in accordance with the output therefrom. In the same manner as in the method of step (A-4) of the stop mode, the output from the sensor 531 or 534 is selected by the multiplexer, and the number of output pulses is counted to detect the actual speed of the carrier.

(C-4) The motor CPU compares a high discriminating speed VH (i.e., a threshold between the high- and middle-speed stop regions) and a low discriminating speed VL (i.e., a threshold between the middle- and low-speed stop regions) with the actual speed VREAL. When condition VREAL>VH is established, the high-speed stop is performed. However, when condition VH>VREAL>VL is established, the low-speed stop is performed.

When the motor CPU determines that the high-speed stop is to be performed upon entrance of the carrier (i.e., in response to an output from the sensor 531 or 534), the motor CPU causes the driver 341 to energize the coil 4142. When the outputs from the sensors 532 and 533 are generated and the carrier has reached the aligning position, the drivers 342 and 343 are driven to energize the coils 4141 and 4143, thereby aligning the carrier with the stator.

When the motor CPU determines that the middle-speed stop is to be performed, the drivers 342 and 343 are driven upon entrance of the carrier, thereby energizing the coils 4141 and 4143.

When the motor CPU determines that the low-speed stop is to be performed, the drivers 342 and 343 are operated to energize the coils 4141 and 4143 upon simultaneous generation of the outputs from the sensors 532 and 533.

In the stop mode, the stop control data is determined after the stop command STP is received, and the stator is ready for receiving the carrier. When the carrier has actually entered above the stator, a braking force acts on the carrier so as to correspond to the inertial force of the carrier, thereby stably stopping the carrier. For this reason, even if the carrier is of light weight, it will not be repelled by a large braking force and will not return to the immediately preceding stator. In addition, even if the carrier is carrying a heavy weight, it will not pass over the stator due to a small braking force.

The operation of the mechanism control CPU will be described hereinafter. When the carrier is stopped at the stop stator in the manner described above, the linear motor controller sends a lift-up instruction to the stator CPU through the cable. The stator CPU sends this instruction to the mechanism CPU through the bus and the interface circuit.

The mechanism CPU 382 causes the driver 3832 to drive the motor 585, so that the slider block 583 is moved upward as described with reference to FIG. 17. Therefore, the carrier is moved upward together with the slider block 583. The mechanism CPU 382 monitors a signal from the switch 561. When the mechanism CPU 382 detects that the carrier has reached the upper limit in accordance with the output signal from the switch 561, the motor 585 is stopped. The mechanism CPU 382 then causes the driver 3842 to operate the rail cover mechanism so as to compensate for the omitted portions of the rails. The motor 751 is driven by the driver 3852 to open the shutter 750.

The teller can then remove an object from or place it on the carrier 6 through the insertion/dispensing port CA or CB. In order to place the object on the carrier and start the carrier, a lift-down instruction is generated from the linear motor controller, and an operation opposite to that described above is performed under the control of the mechanism CPU 382, and the carrier 6 is moved downward and placed on the rails. Thereafter, the transport control as described above is performed to start the carrier 6.

As described above, in order to cancel the stop mode of the stator, a cancel command CAN is sent from the linear motor controller to the respective stators which are then set in the neutral mode.

The present invention is exemplified by the above-described particular embodiment. However, various changes and modifications may be made within the spirit and scope of the invention. In the above embodiment, the maximum and minimum speed data shown in FIG. 7 are used as the control speed data. However, the correction value based upon the rail-path shape of FIG. 7 may be used in place of the maximum and minimum speed data. In this case, the standard speed control characteristic curve is prepared for a linear rail-path. The correction data for the rail-path shapes (e.g., curve and ascending slope) are calculated. The correction data are supplied as the speed data to the motor CPU and are stored in the speed table. The correction data corresponding to the rail-path shape is added to the designated speed derived by the linear motor controller from the standard speed control characteristic curve.

We claim:

1. A transport control system with linear motor drive comprising:
   a rail-path for providing a route of transport;
   a carrier driven along said rail-path by linear motor drive;
   a plurality of stator portions coupled to said rail-path to produce a driving force in association with said carrier; and
   a main controller for deriving a plurality of optimum velocities of said carrier at stator portions from an ideal speed control characteristic curve and for sending velocity data of said optimum velocities to stator portions respectively;
   each of said stator portions including a stator controller for controlling the driving of said carrier, said main controller having means for multiple address transmission of the optimum velocities and means for sending to each respective said stator controller information indicating rail configuration, and said stator controller having means for rail configuration selection, said stator controller selects an optimal velocity of said carrier on the basis of the selection by said rail configuration selection means or the information indicating the rail configuration from said main controller and the velocity data from said main controller.

2. A transport control system with linear motor drive comprising:
   a rail-path for providing a route of transport;
   a carrier driven along said rail-path by linear motor drive;
   a plurality of stator portions coupled to said rail-path to produce a driving force in association with said carrier; and
   a main controller for deriving a plurality of optimum velocities of said carrier at stator portions regarding a predetermined ideal rail-path and for sending velocity data of said optimum velocities to stator portions respectively;
   each of said stator portions including stator controller for controlling the driving of said carrier, said main controller having means for multiple address transmission of optimum velocities and means for sending to said stator controller information indicating rail configuration, and said stator controller having means for selecting an optimal velocity of said carrier on the basis of the information indicating the rail configuration from said main controller and the velocity data from said main controller, and said main controller having means for detecting obstacles in said rail-path and controlling the start of said carrier on the basis of the result of said obstacle detection.

3. A system according to claim 2, wherein said main controller has means for detecting a failure in operation of said stator controller, the driving of said carrier being started after the absence of the failure in operation of said stator controller is detected.

4. A system according to claim 2, wherein said main controller has means for detecting an existence overlap of a portion of the range where the running of the carrier is expected with a portion of the range where the carrier is actually running, the driving of said carrier being started when the overlap does not exist.

5. A system according to claim 2, wherein said main controller has means for detecting a failure in operation of a destination stator portion in said plurality of stator portions.

* * * * *

UNITED STATES PATENT AND TRADEMARK OFFICE
CERTIFICATE OF CORRECTION

PATENT NO. : 4,876,966

DATED : October 31, 1989

INVENTOR(S) : KAZUYOSHI OKAWA et al.

It is certified that error appears in the above-identified patent and that said Letters Patent is hereby corrected as shown below:

FRONT PAGE, after the entire section of [76], please insert the following section which was inadvertently omitted by the Patent Office.

--[73] Assignee: Fujitsu Limited, Kawasaki, Japan--.

[30] Please delete this section in its entirety and insert the following new section:

--[30] Foreign Application Priority Data
Mar. 6, 1984 [JP] Japan ....... 59-043587
Mar. 6, 1984 [JP] Japan ....... 59-043588
Mar. 6, 1984 [JP] Japan ....... 59-043589
Mar. 6, 1984 [JP] Japan ....... 59-043590
Mar. 6, 1984 [JP] Japan ....... 59-043591--.

Col. 9, line 50, "6" should be --$\underline{6}$--;
line 51, "4" should be --$\underline{4}$--.

Col. 14, line 32, "SVC" should be --SVc--;
line 33, "SVC" should be --SVc--;
line 36, "SV" should be --SVc--;
line 53, "SVC" should be --SVc--.

UNITED STATES PATENT AND TRADEMARK OFFICE
CERTIFICATE OF CORRECTION

PATENT NO. : 4,876,966

DATED : October 31, 1989

INVENTOR(S) : KAZUYOSHI OKAWA et al.

It is certified that error appears in the above-identified patent and that said Letters Patent is hereby corrected as shown below:

Col. 19, line 32, "color" should be --coil--.

Col. 22, line 41, after "including" insert --a--.

Signed and Sealed this

Twenty-ninth Day of January, 1991

Attest:

HARRY F. MANBECK, JR.

*Attesting Officer*    Commissioner of Patents and Trademarks